(12) United States Patent
Shiozawa et al.

(10) Patent No.: US 7,889,261 B2
(45) Date of Patent: Feb. 15, 2011

(54) IMAGE CAPTURE AND DISPLAY CONTROL APPARATUS, IMAGE CAPTURE AND DISPLAY CONTROL METHOD, AND IMAGE CAPTURE AND DISPLAY SYSTEM

(75) Inventors: Hideto Shiozawa, Kawasaki (JP); Koji Takekoshi, Yokohama (JP); Yuichi Nishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 460 days.

(21) Appl. No.: 11/962,313

(22) Filed: Dec. 21, 2007

(65) Prior Publication Data

US 2008/0151070 A1  Jun. 26, 2008

(30) Foreign Application Priority Data

Dec. 26, 2006  (JP) .............................. 2006-350496

(51) Int. Cl.
*H04N 5/222* (2006.01)
(52) U.S. Cl. .............................. 348/333.01; 348/207.99
(58) Field of Classification Search ............ 348/207.99, 348/333.02–333.06
See application file for complete search history.

(56) References Cited

U.S. PATENT DOCUMENTS

| | | | | |
|---|---|---|---|---|
| 6,512,548 | B1 * | 1/2003 | Anderson | 348/333.05 |
| 7,301,562 | B2 * | 11/2007 | Belz et al. | 348/207.99 |
| 7,349,565 | B2 | 3/2008 | Tago et al. | 382/132 |
| 7,505,634 | B2 | 3/2009 | Tago et al. | 382/284 |
| 7,511,721 | B2 | 3/2009 | Takekoshi | 345/630 |
| 2004/0172292 | A1 | 9/2004 | Takekoshi et al. | 705/2 |
| 2009/0001276 | A1 | 1/2009 | Yagi et al. | 250/370.09 |

FOREIGN PATENT DOCUMENTS

| | | |
|---|---|---|
| JP | 61-269582 A1 | 11/1986 |
| JP | 5-35195 A1 | 2/1993 |
| JP | 2004-325821 A1 | 11/2004 |

* cited by examiner

*Primary Examiner*—Sinh Tran
*Assistant Examiner*—Anthony J Daniels
(74) *Attorney, Agent, or Firm*—Fitzpatrick, Cella, Harper & Scinto

(57) ABSTRACT

The invention provides an image capture and display control apparatus that includes an imaging control unit that operates an image capturing unit at a first time interval so as to obtain a captured image with the image capturing unit and a display control unit that displays the captured image on a display unit, which operates at a second time interval. The apparatus changes at least one of an image capture start timing of the image capturing unit and a processing time from the start of image capturing by the image capturing unit until entering a standby state in which the captured image can be displayed by the display unit, so as to shorten a display delay time, which is caused by the second time interval, from the start of operation by the image capturing unit until display of the image data by the display unit.

9 Claims, 20 Drawing Sheets

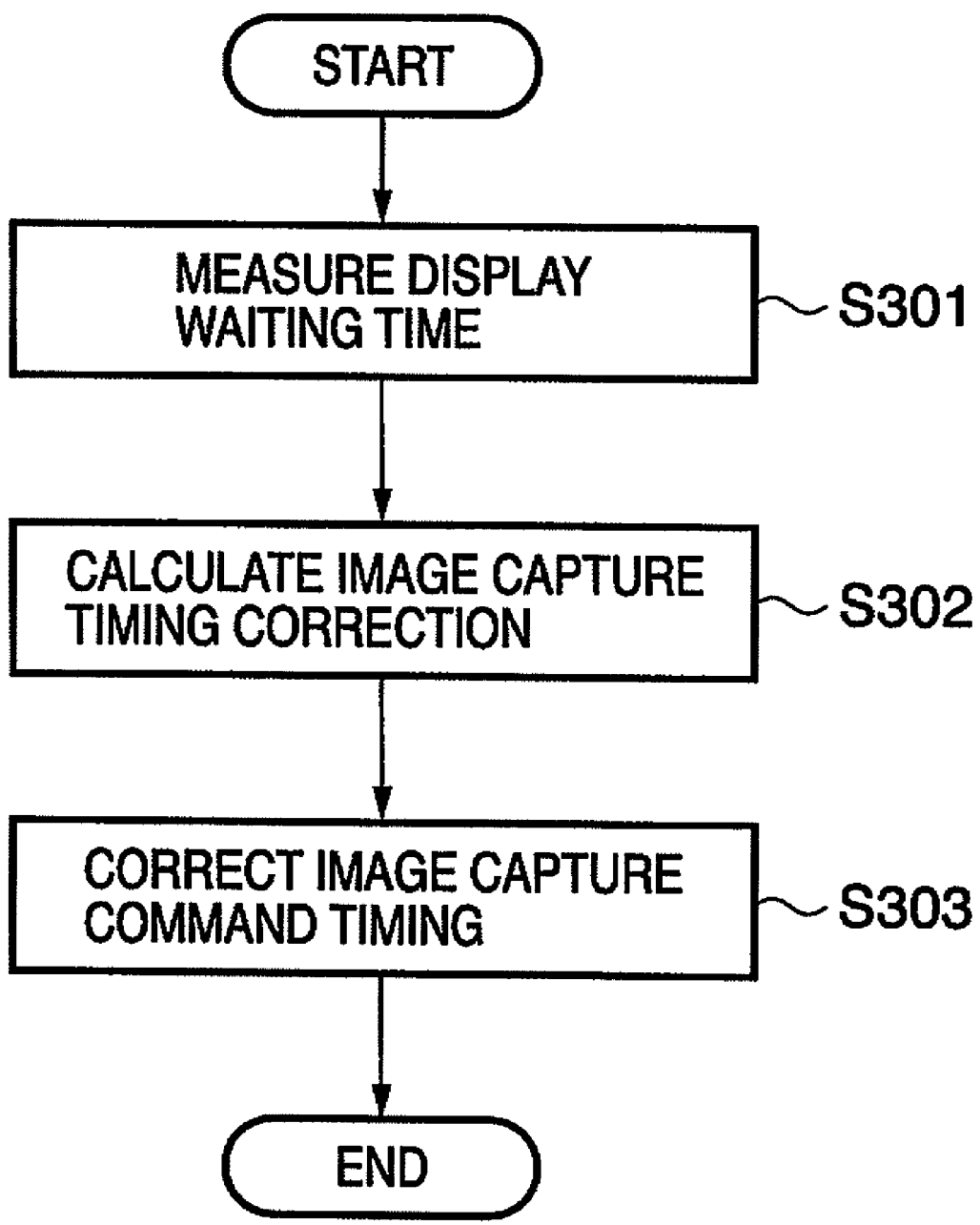

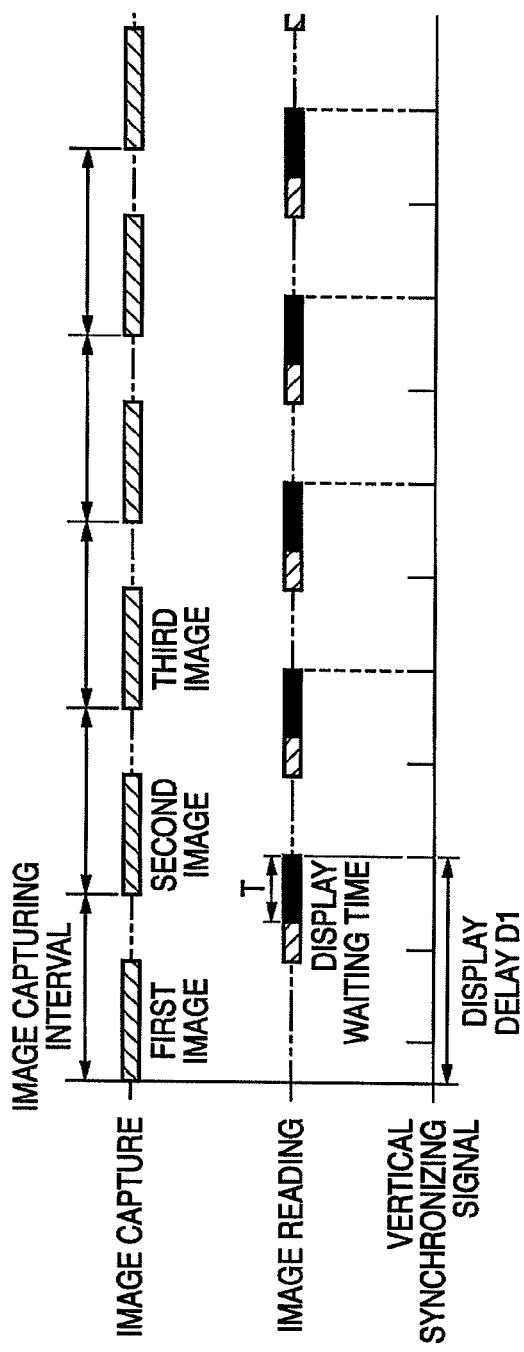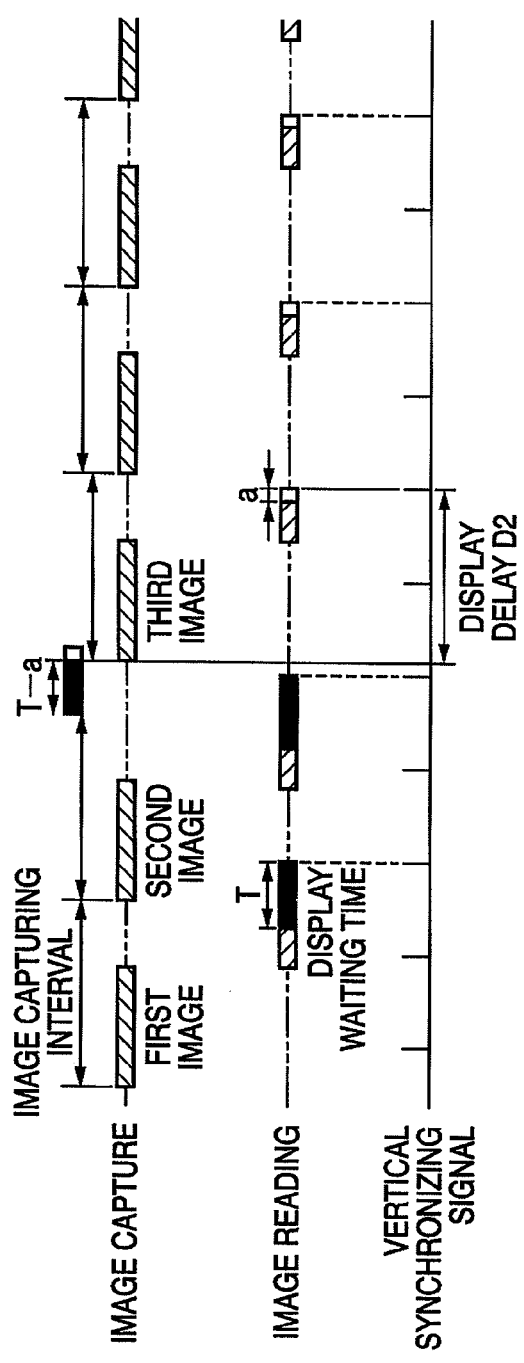

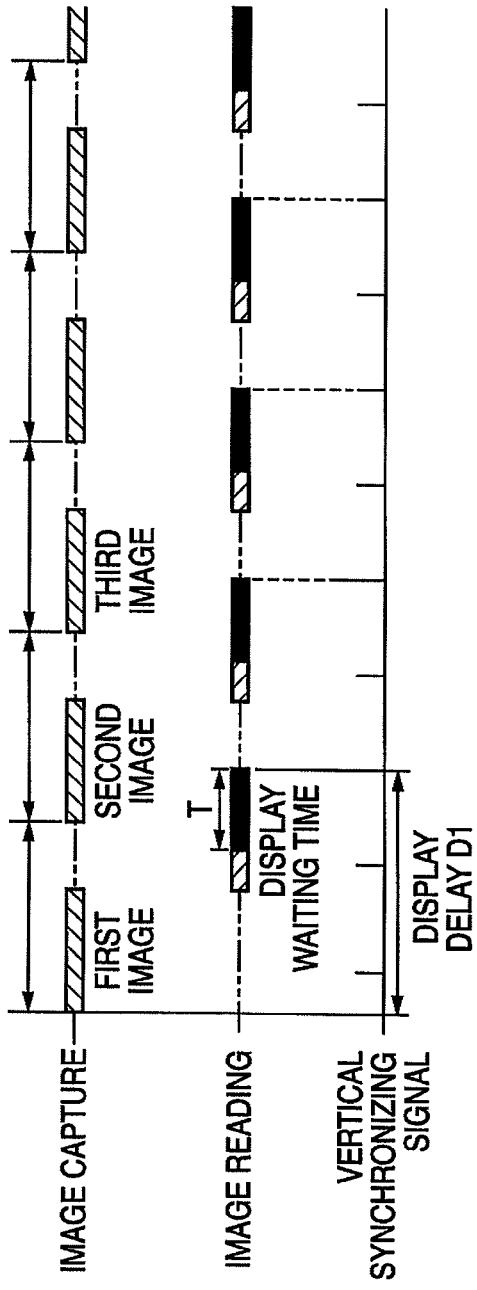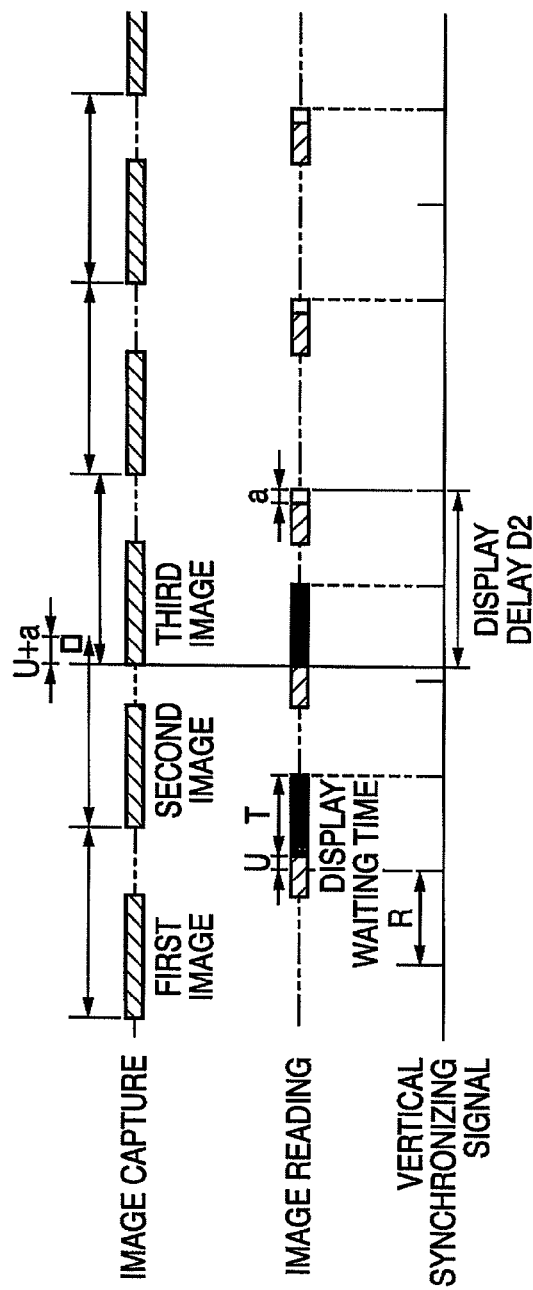
FIG. 6A
FIG. 6B

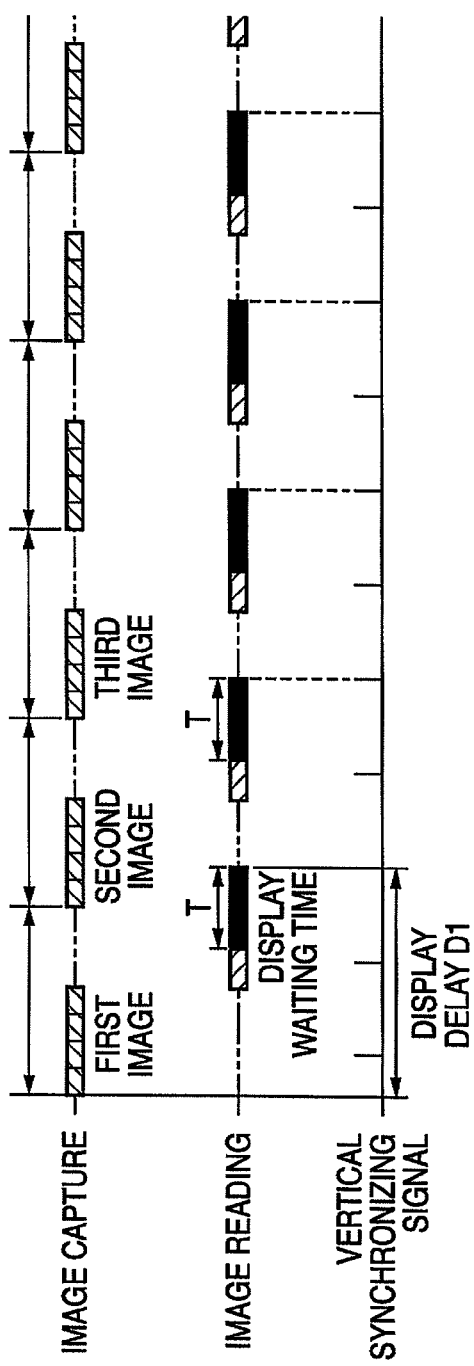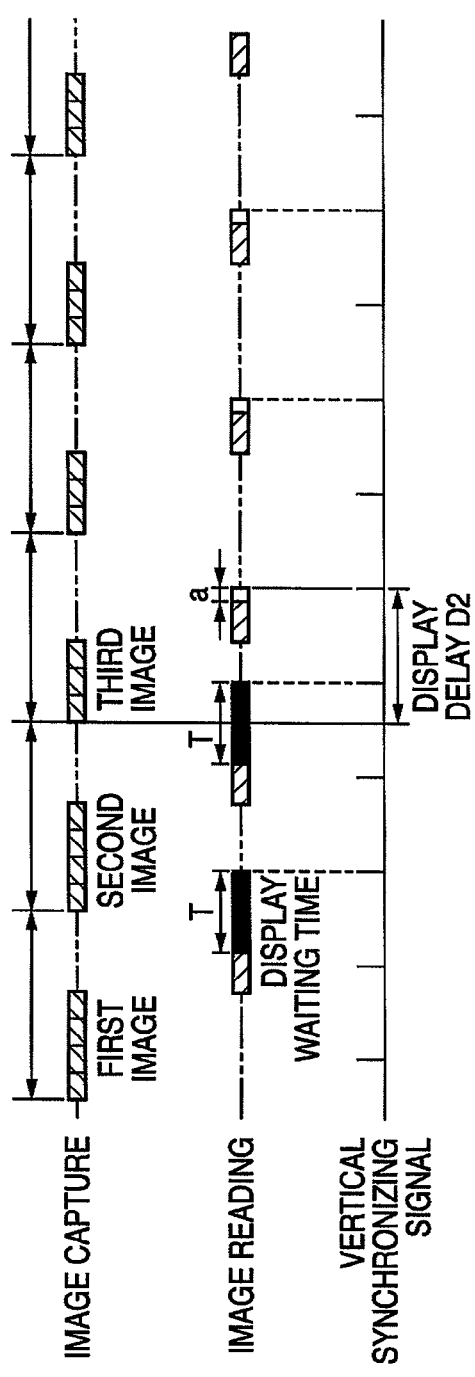
FIG. 8A
FIG. 8B

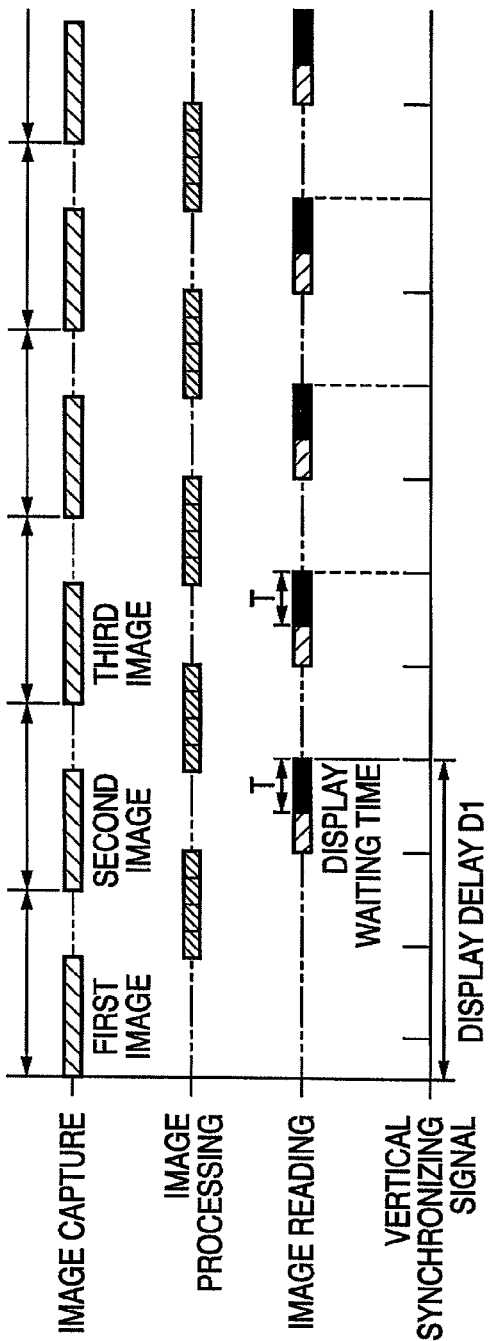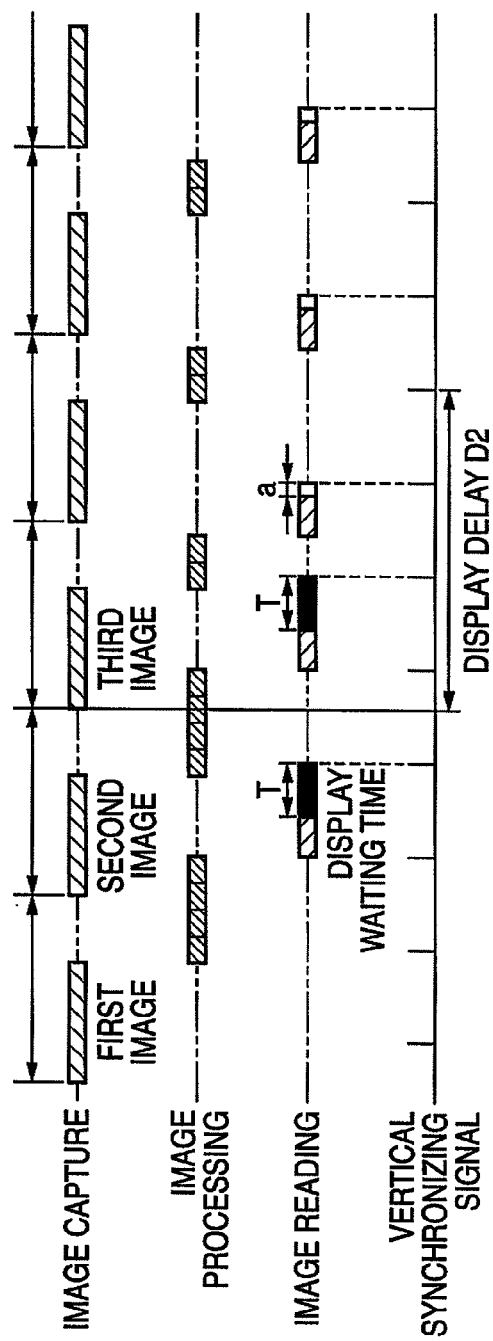

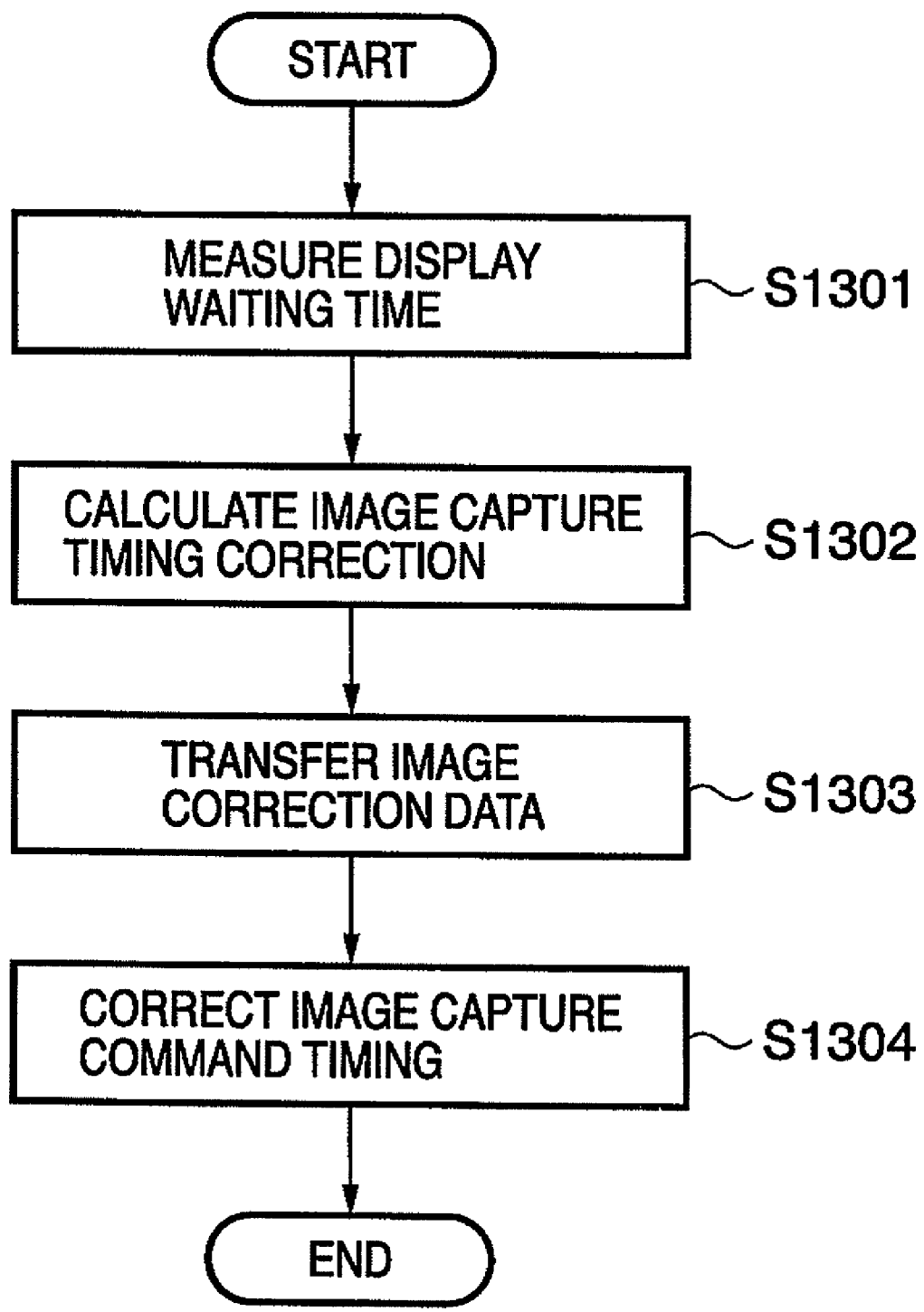

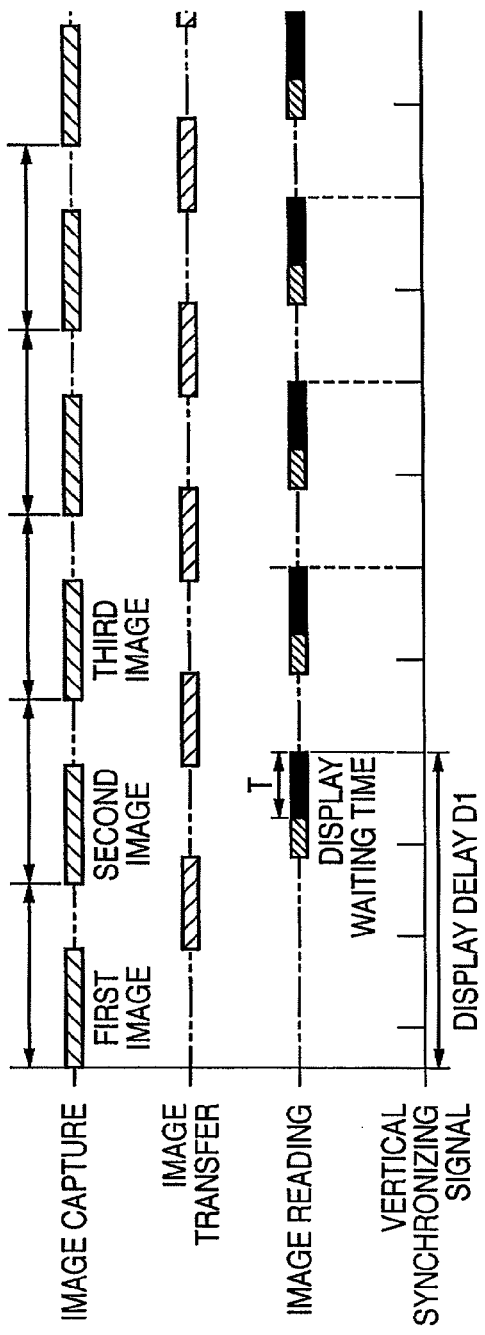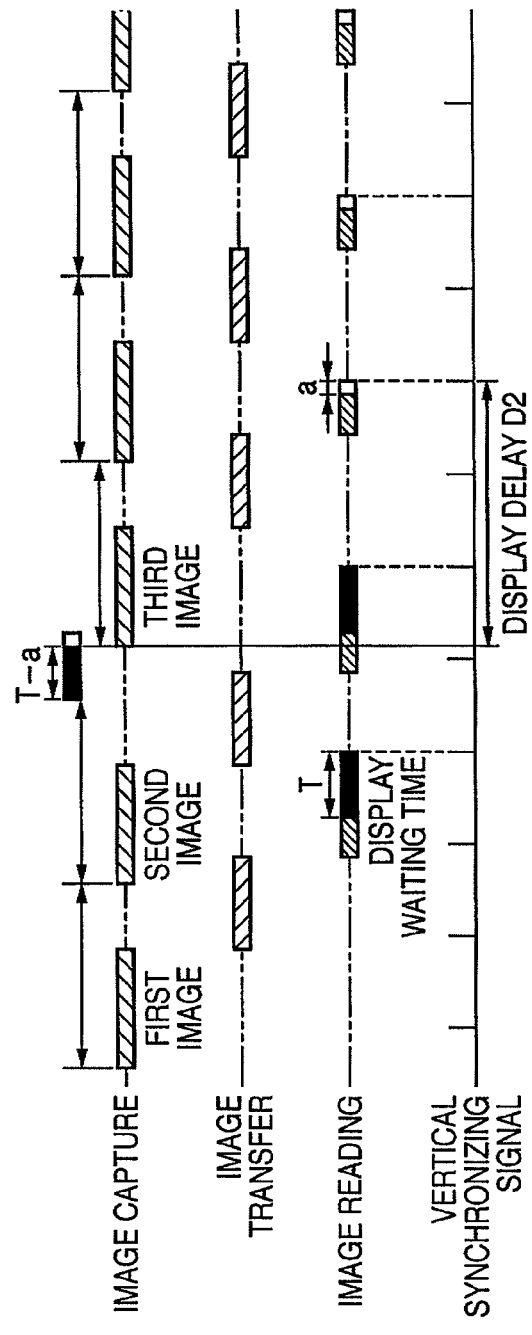

IMAGE CAPTURE AND DISPLAY CONTROL APPARATUS, IMAGE CAPTURE AND DISPLAY CONTROL METHOD, AND IMAGE CAPTURE AND DISPLAY SYSTEM

BACKGROUND OF THE INVENTION

1. Field of the Invention

The present invention relates to an image capture and display control apparatus, an image capture and display control method, and an image capture and display system, for real time display on a display apparatus of images that have been captured by an image capturing apparatus.

2. Description of the Related Art

Image capture and display control apparatuses that are provided with an image capturing apparatus and a display apparatus, and that display captured images from the image capturing apparatus on the display apparatus in real time, are known (Japanese Patent Laid-Open No. S61-269582, Japanese Patent Laid-Open No. H5-35195, Japanese Patent Laid-Open No. 2004-325821). In apparatuses that perform the capture and display of images in real time, images are captured at a timing that is in accord with the frame rate of the image capturing apparatus, and images that are obtained are immediately displayed on the display apparatus.

In such real time capture and display of images, it is desirable for the time differential (hereinafter, the display delay time) between imaging by the image capturing apparatus and display of the image by the display apparatus to be short. However, in recent popular display devices, such as liquid crystal monitors, the timing of the display is controlled by the display apparatus, and problems with the image, such as tearing, occur when the image is output while ignoring the display timing of the display apparatus. Thus, even when imaging, for example, by the image capturing apparatus has finished and display of the image is possible, display of that image is delayed until the display timing of the display apparatus. Hereinafter, this waiting time will be referred to as the display waiting time.

The interval of the display timing of the display apparatus is determined by the display capabilities of the display apparatus. For example, consider the case of a liquid crystal monitor with a resolution of 1600×1200 pixels and a 60 Hz refresh rate. The display timing of the liquid crystal monitor is determined by the refresh rate, and in this case, the image information is displayed at an interval of approximately 16.7 ms. In other words, there is the possibility that as much as 16.7 ms will be wasted as the display waiting time between the point that display of the image by other than the liquid crystal monitor becomes possible and the actual display on the monitor.

As discussed above, image capturing apparatuses have an image capturing timing known as the frame rate, and display apparatuses have a timing at which display of an image occurs. Thus, since each apparatus has its own timing, there is the issue that unnecessary waiting for display occurs when capturing and displaying images in real time, and this causes the display delay time to become long. When the display delay time is long, the ability to track the display to the image that is being captured becomes worse. For example, in a case where a physician conducts surgery while performing fluoroscopy with an x-ray fluoroscopy apparatus for medical use, it is necessary for surgical operations by the physician to be reflected on the screen instantly, making it crucial for any delay in the display to be shortened as much as possible.

Particularly when the timing interval between the image capturing apparatus and the display apparatus is an integer multiple, it becomes necessary for a display waiting time to always be present during image capturing. FIG. 20 shows a simple example. For example, if the image capturing interval of the image capturing apparatus is 32 ms, and the display interval of the display apparatus is 16 ms, then it can be understood that the same display waiting time will occur for all images that are captured by the image capturing apparatus.

SUMMARY OF THE INVENTION

The representative embodiments of the invention illustrate an image capture and display apparatus, system, and method that shorten the display delay time from the capture of an image by the image capturing apparatus to display by the display apparatus in order to achieve image display that favorably tracks with the imaged information.

According to one aspect of the present invention, there is provided an image capture and display control apparatus, comprising:

an imaging control unit adapted to operate an image capturing unit at a first time interval so as to obtain a captured image with the image capturing unit;

a display control unit adapted to display the captured image on a display unit, which is operated at a second time interval; and a changing unit adapted to change at least one of an image capture start timing of the image capturing unit and a processing time from a start of image capturing by the image capturing unit until entering a standby state in which the captured image can be displayed by the display unit, so as to shorten a display delay time, which is caused by the second time interval, from the start of the imaging operation of the image capturing unit until display of the captured image by the display unit.

According to another aspect of the present invention, there is an image capture and display system that is provided with an imaging control apparatus for operating an image capturing unit at a first time interval so as to obtain a captured image with the image capturing unit, and a display control apparatus for causing the captured image to be displayed on a display unit, which is operated at a second time interval;

wherein the image capture and display system comprises:

a transmission unit adapted to send the captured image that is obtained by the image capturing unit from the imaging control apparatus to the display control apparatus; and a changing unit adapted to change at least one of an image capture start timing of the image capturing unit and a processing time from a start of image capturing by the image capturing unit until a standby state in which the captured image can be displayed by the display unit, so as to shorten a display delay time, which is caused by the second time interval, from the start of the imaging operation by the image capturing unit until display of the captured image by the display unit.

Furthermore, according to another aspect of the present invention, there is provided an image capture and display control method, comprising:

an imaging control step of operating an image capturing unit at a first time interval so as to obtain a captured image with the image capturing unit;

a display control step of causing display of the captured image by a display unit that is operated at a second time interval; and a changing step of changing at least one of an image capture start timing of the image capturing unit and a processing time from a start of image capturing by the image capturing unit until entering a standby state in which the captured image can be displayed by the display unit, so as to shorten a display delay time, which is caused by the second time interval, from the start of the imaging operation of the image capturing unit until display of the captured image by the display unit.

Further features of the present invention will become apparent from the following description of exemplary embodiments with reference to the attached drawings.

BRIEF DESCRIPTION OF THE DRAWINGS

FIG. 3 is a flowchart showing the timing correction processing according to the first embodiment.

FIGS. 4A and 4B are time charts showing how the timing is corrected in the first embodiment.

FIGS. 6A and 6B are time charts showing how the timing is corrected in the second embodiment.

FIGS. 8A and 8B are time charts showing how the timing is corrected in the third embodiment.

FIGS. 10A and 10B are time charts showing how the timing is corrected in the fourth embodiment.

FIG. 13 is a flowchart showing the timing correction processing according to the fifth embodiment.

FIGS. 14A and 14B are time charts showing how the timing is corrected in the fifth embodiment.

DESCRIPTION OF THE EMBODIMENTS

Preferred embodiments of the present invention will now be described in detail in accordance with the accompanying drawings.

First Embodiment

Figure 1:
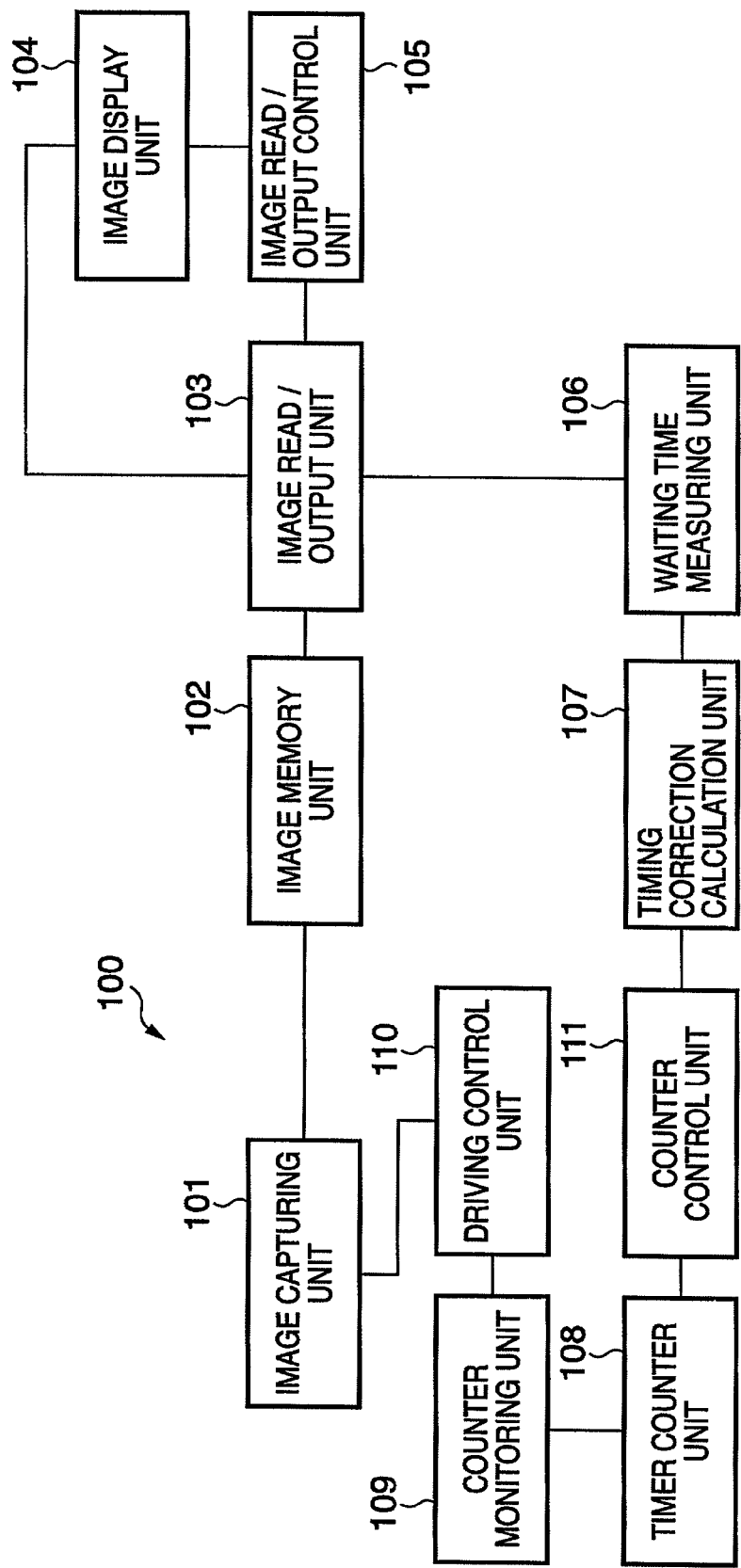
FIG. 1 is a block diagram showing the functional configuration of the image capture and display apparatus according to the first embodiment.

First, the configuration and the operation of an image capture and display apparatus according to a first embodiment is described. FIG. 1 is a block diagram showing the functional configuration of an image capture and display apparatus 100 according to the first embodiment.

An image capturing unit 101 obtains image data by detecting incident light or radiation (x-ray) from the outside using a photodiode and capturing that image. Note that the configuration of the image capturing unit 101 is not limited to the above. For example, the image capturing unit 101 may comprise a detector having a conversion material that directly converts X-ray into an electrical charge, such as amorphous selenium (a-Se). An image memory unit 102 temporarily stores the image data that have been obtained by the image capturing unit 101. An image read/output unit 103 reads the image data stored on the image memory unit 102 and outputs the image data for display to an image display unit 104. The image read/output unit 103 is constituted by image display hardware like a graphics card, and software for operating that hardware. The image display unit 104 displays the image data that have been output from the image read/output unit 103. The image display unit 104 is for example constituted by a liquid crystal monitor or the like, and images are displayed at a fixed time interval (refresh rate) that is determined by the properties of that monitor.

An image read/output control unit 105 receives a vertical synchronizing signal that indicates the display interval of the image display unit 104, and controls the timing at which image data are output by the image read/output unit 103 in synchronization with that vertical synchronizing signal. The image read/output control unit 105 is made of image display hardware such as a graphics card and software for operating that hardware. It should be noted that the image read/output control unit 105 performs control such that image output is not performed if the image read/output unit 103 has not read the information of a single image.

A waiting time measuring unit 106 measures the time between the point that the image read/output unit 103 has read all the image data of a single image from the image memory unit 102 and completed preparation for display, and the point that the image read/output unit 103 outputs the image data to the image display unit 104 to be displayed. For example, the waiting time measuring unit 106 starts measurement from the completion of reading of an image by the image read/output unit 103, and stops measurement when the image is output by the image read/output unit 103. It should be noted that the timing for ending measurement can also be determined by an output control instruction from the image read/output control unit 105. A timing correction calculation unit 107 obtains the time measured by the waiting time measuring unit 106 and calculates correction data for correcting the image capturing timing of the image capturing unit 101.

A timer counter unit 108 counts time so that the image capturing unit 101 can capture images at a fixed interval. When the value counted by the timer counter unit 108 becomes a particular fixed value, a counter monitoring unit 109 sends a drive command to a driving control unit 110, as well as resets the count value. The driving control unit 110 drives the image capturing mechanism of the image capturing unit 101 with the drive command from the counter monitoring unit 109. A counter control unit 111 changes the value of the timer counter unit 108 based on the correction data from the timing correction calculation unit 107.

Figure 2:
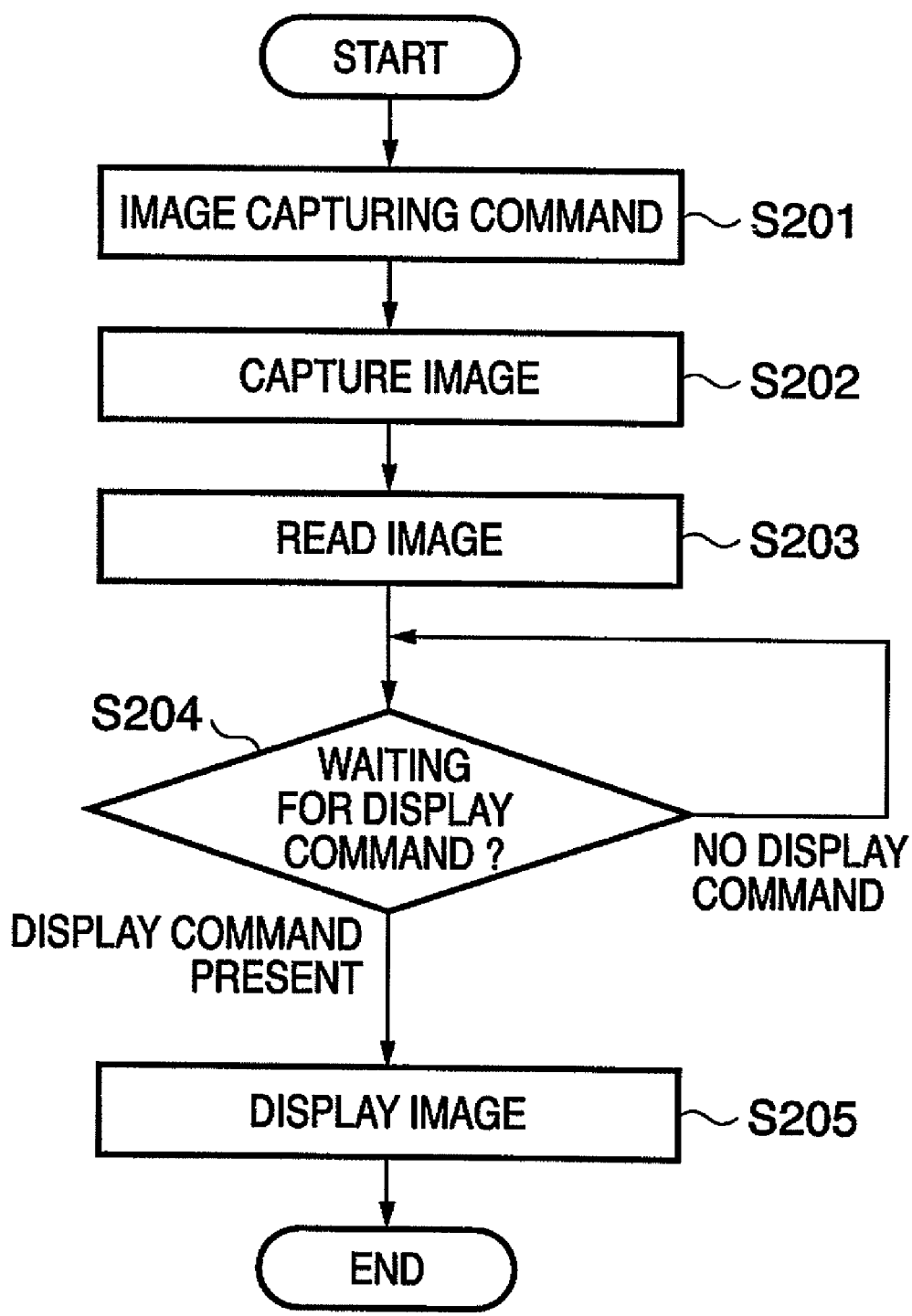
FIG. 2 is a flowchart showing the image display processing according to the first embodiment.

FIG. 2 is a flowchart that shows the processing from the capture to the display of an image by the image capture and display apparatus 100 of this embodiment.

In step S201, the driving control unit 110 sends an image capture command to the image capturing unit 101. In step S202, the image capturing unit 101, which has received this image capture command, performs image capturing and obtains image data. It should be noted that the image data that are obtained by the image capturing unit 101 are stored in the image memory unit 102. Next, in step S203, the image read/output unit 103 reads the image data from the image memory unit 102 and enters a state in which it can output the image data to the image display unit 104. In step S204, the image read/output unit 103 enters standby until a display command (output command) arrives from the image read/output control unit 105. When the image read/output unit 103 receives a display command from the image read/output control unit 105, in step S205 it outputs the image data to the image display unit 104 so that they may be displayed.

FIG. 3 is a flowchart that describes the process for correcting the image capturing timing of the image capture and display apparatus 100 of this embodiment.

In step S301, the waiting time measuring unit 106 measures the display waiting time from the point that the image read/output unit 103 reads image data from the image memory unit 102 and enters an image displayable state, to the point that the image data are output to the image display unit 104 (image display). Next, in step S302, the timing correction calculation unit 107 calculates correction data that show the time to be corrected based on the display waiting time that has been measured by the waiting time measuring unit 106 (image capturing timing correction calculation). Then, in step S303, the counter control unit 111 changes the value of the timer counter unit 108 in accordance with the correction data from the timing correction calculation unit 107, correcting the image capturing timing.

FIGS. 4A and 4B are diagrams that illustrate timing correction in the first embodiment. FIGS. 4A and 4B show the time required for capture of an image by the image capturing unit 101, the time required for image reading, and the vertical synchronizing signal of the image display unit 104. FIG. 4A expresses the image capturing, image reading, and display operations by a conventional image capture and display apparatus, and FIG. 4B expresses the image capturing, image reading, and display operations by the image capture and display apparatus 100 of this embodiment. Here, because image reading occurs via the image memory unit 102, it can be executed during operation of the image capturing unit 101. The display delay time indicates the delay D from image capture to display, and in the real time image capture/display operation shown in FIG. 4A, a delay D1 always occurs. In this embodiment, as shown in FIG. 4B, control is performed so as to shorten the display delay time (delay D2<delay D1). Below, a description is given with reference to FIG. 4B.

A single image requires a display waiting time T from the point that image capturing and image reading are finished and display is possible, to the point that the vertical synchronizing signal occurs and display of the image on the image display unit 104 begins. The display waiting time T is measured by the waiting time measuring unit 106. Based on the display waiting time T, the timing correction calculation unit 107 calculates how much timing manipulation must be performed in order to shorten the display delay. Here there is a danger that when correction is performed such that the display waiting time after correction (the waiting time from the point that display becomes possible until the vertical synchronizing signal occurs) is 0, the processing time error of the various processing units will cause the target vertical synchronizing signal to be missed, requiring a long waiting time until the next vertical synchronizing signal. Accordingly, correction is performed after setting a value in advance so as to perform vertical synchronizing waiting for only a very brief time a.

In the case of FIG. 4B, the timing correction calculation unit 107 calculates the correction time from T−a. The counter control unit 111 then controls the timer counter unit 108 so that it lengthens the count by T−a with respect to the next interval, and by doing so, from the third image onward the display waiting time is only the time a. The result is that a reduction in the display delay time is achieved (the delay is shortened from delay D1 to delay D2).

Further, in this embodiment, when the interval between images captured by the image capturing unit 101 and the interval of the vertical synchronizing signal in the image display unit 104 are an integer factor of one another, then in theory, it should be sufficient to perform the above timing correction only once. In practice, however, it is executed periodically (every predetermined number of image captures) in consideration of the processing time error of the system. It is also necessary to execute the above timing correction when a system user performs an operation such as changing the frame rate. The value a that is used for timing correction can also be determined as follows. That is, the standard deviation of the display waiting time after timing correction is found by continuing to measure the vertical synchronizing signal wait (the display waiting time), and the value a can be found from this standard deviation such that the processing time error by the various processing units can be absorbed. It is also possible to store this value in advance and then use it at the occasion of the next image capture.

Thus, with the first embodiment, the timer counter unit 108, the counter monitoring unit 109, and the driving control unit 110 constitute an image capture control unit that activates the image capturing unit 101 and causes it to execute the imaging operation at an image capturing interval that has a first time interval. The image read/output unit 103 and the image read/output control unit 105 constitute a display control unit that causes image data that have been obtained through the above imaging operation to be displayed on the image display unit 104 at a vertical synchronizing interval that has a second time interval, which is different from the first time interval. Then, the waiting time measuring unit 106 measures the display waiting time (T) from the standby state where the image data that have been obtained by the imaging operation can be displayed by the image display unit 104 to when the display control unit displays the image data on the image display unit 104. The timing correction calculation unit 107 and the counter control unit 111 change the start timing of the imaging operation based on the measured display waiting time so that the display delay time until the image data obtained by the imaging operation are displayed on the display unit becomes shorter. More specifically, the timing correction calculation unit 107 calculates an adjusting time (T−a) by subtracting a time (a) that has been chosen in advance from the display waiting time (T). The counter control unit 111 then changes the count value of the timer counter unit 108 so as to delay the start of the imaging operation by that adjusting time. By performing control in this way, the display delay time is shortened (from D1 to D2), as illustrated in FIG. 4B.

Thus, with the first embodiment, in regards to the shortening of the display delay, which is desired in real time image capture and display, the shift in timing between the image capturing unit and the image display unit is corrected in order to achieve a reduction in the display delay time. In particular, with this embodiment, it is possible to solve the issue that a display waiting time regularly occurs when the frame rate of the image capturing unit and the display interval of the display unit (the vertical synchronizing signal interval) are integer factors of one another.

Second Embodiment

Figure 5:
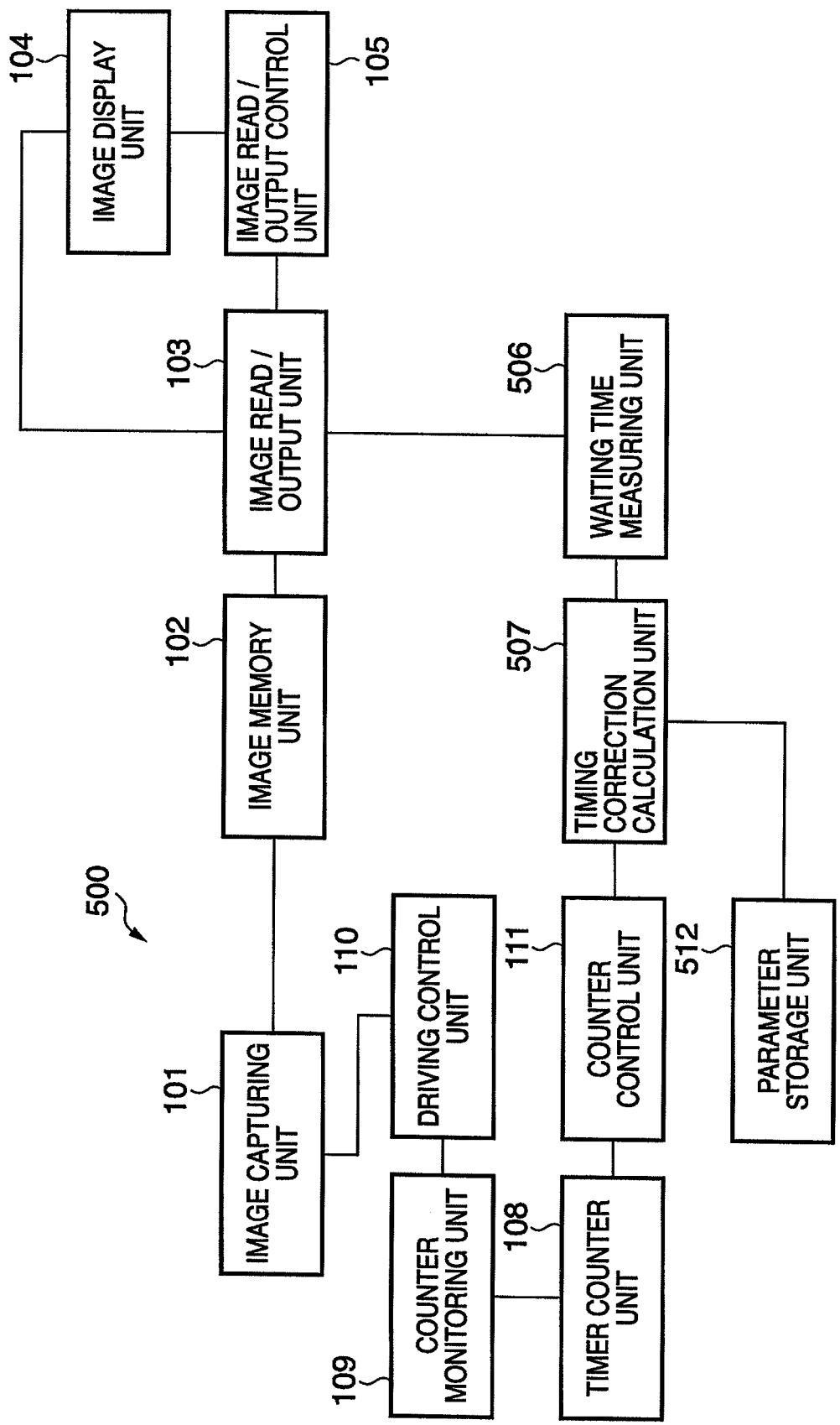
FIG. 5 is a block diagram showing the functional configuration of the image capture and display apparatus according to the second embodiment.

Next, the configuration and the operation of an image capture and display apparatus according to a second embodiment are described. FIG. 5 is a block diagram that shows the functional configuration of an image capture and display apparatus 500 according to the second embodiment. In FIG. 5, structural elements that are identical to those in the first embodiment (FIG. 1) have been assigned the same reference numerals as before. In the configuration of the second embodiment, a waiting time measuring unit 506 has the function of measuring the vertical synchronizing interval of the image display unit 104. A timing correction calculation unit 507, as will be described in further detail below, calculates correction data so as to perform timing correcting that exploits the vertical synchronizing interval. A parameter storage unit 512 stores the shortest interval between imaging by the image capturing unit 101.

FIGS. 6A and 6B are diagrams that illustrate the timing correction in the second embodiment. Like FIGS. 4A and 4B, FIG. 6A expresses the image capturing, image reading, and display operations by a conventional image capture and display apparatus, and FIG. 6B expresses the image capturing, image reading, and display operations by the image capture and display apparatus 500 of the second embodiment. In this embodiment as well, the display delay time D1 of the conventional image capture and display apparatus is shortened to D2.

In FIG. 6B, reading of the first image is complete immediately after the vertical synchronizing signal, and thus the waiting time until display becomes the time until the next vertical synchronizing signal. Here, the timing correction calculation unit 507 obtains the interval R of the vertical synchronizing signal from the waiting time measuring unit 506, and from the display waiting time T calculates the time U by which display was missed (U=R−T). Further, the timing correction calculation unit 507 calculates the correction data by U+a. Then, a counter control unit 111 controls a timer counter unit 108 so that its count is shortened by U+a with respect to the next interval and changes the timing at which capturing of the third image occurs, and by doing so sets a vertical synchronizing waiting time of time a from the third image onward.

It should be noted that the shortening of the display delay time in the second embodiment can be adopted in a case where the image capturing interval can be shortened by U+a from the current image capturing interval. This determination can be performed by comparison with the minimum image capturing interval that is obtained from the parameter storage unit 512. Shortening of the display delay time cannot be carried out in a case where d<U+a, where d is the time by which the image capturing interval can be shortened from the current image capturing interval (the difference between the current image capturing interval and the minimum image capturing interval). In this case, the display delay time can be shortened in accordance with the correction processing discussed in the first embodiment. In other words, the timing correction calculation unit 507 calculates T−a as the correction data like in the first embodiment, and the counter control unit 111 shortens the display delay time by delaying the next image capturing interval by T−a. Alternatively, it is possible to adopt a configuration in which the adjusting operation of the second embodiment is performed over more than one frame in a case where d<U+a. For example, if it is determined that d<U+a, then the image capturing interval of the next image capture is shortened by d and the above adjusting is continued, and ultimately it is possible to appropriately adjust the image capturing timing and the display timing.

In the second embodiment, the timing correction calculation unit 507 finds the adjusting time (U+a) by adding a predetermined time (a) to the time (U=R−T) that is obtained by subtracting the display waiting time (T) that was obtained by the waiting time measuring unit 506 from the vertical synchronizing interval (R) of the image display unit 104. The counter control unit 111 then speeds up the start timing of the imaging operation of the image capturing unit 101 by the adjusting time (U+a). Performing control in this manner allows the display delay time to be shortened (from D1 to D2), as described in FIG. 6B. In the second embodiment, timing adjustment is performed by shortening the image capturing interval, and thus it is possible to adjust the timing without extending the image capturing interval when timing adjustment is executed.

It should be noted that it is also possible to adopt a configuration in which, when d is regarded as the time by which the image capturing interval can be shortened over the current image capturing interval (the difference between the current image capturing interval and the minimum image capturing interval), then the correction method of the second embodiment can be adopted when d≧U+a, and the correction method of the first embodiment can be adopted when d<U+a. In this case, the timing correction calculation unit 507 determines whether or not the time interval between image captures that has been calculated is equal to or greater than a predetermined time interval (the minimum image capturing interval of the image capturing unit 101) when the timing of the imaging operation has been hastened by the adjustment time (U+a). Then, if it is determined that the image capture time interval that has been calculated is equal to or greater than the predetermined time interval, the counter control unit 111 changes the setting of the timer counter unit 108 so as to speed up the start timing of the imaging operation by the adjusting time (U+a). On the other hand, if it is determined that the image capture time interval that has been calculated is not equal to or greater than the predetermined time interval, then the timing correction calculation unit 507 and the counter control unit 111 execute the correction method of the first embodiment. In other words, the start timing of the imaging operation is delayed by the adjusting time (T−a), which is obtained by subtracting the predetermined time from the display waiting time.

Third Embodiment

Next, a third embodiment is described. In the first and second embodiments, the display delay time was shortened by changing the timing at which the image capturing unit 101 begins image capture. The third embodiment describes a configuration that achieves a reduction in the display delay time by changing the nature of the processing by the image capturing unit in order to change the image capture processing time.

Figure 7:
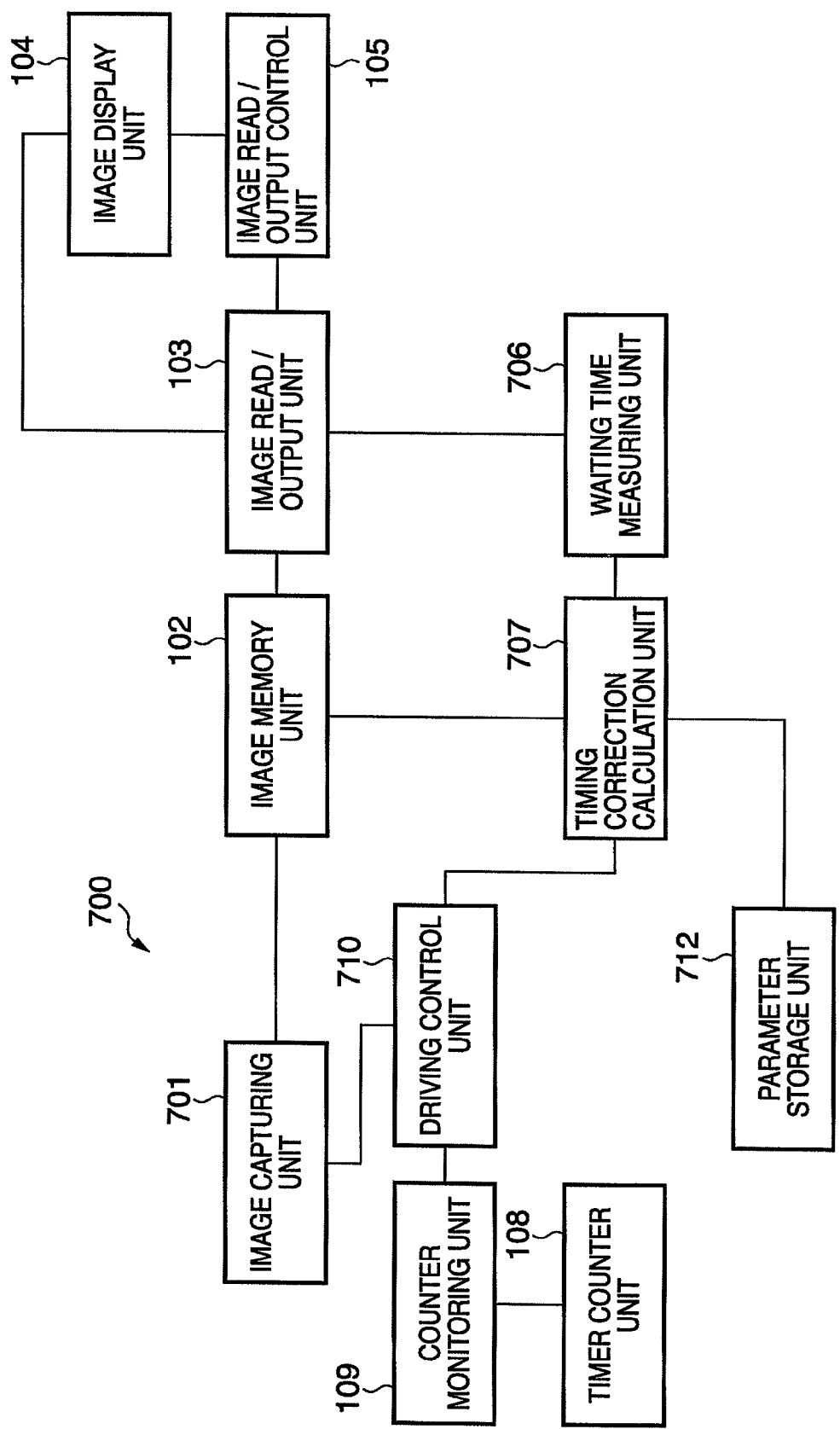
FIG. 7 is a block diagram showing the functional configuration of the image capture and display apparatus according to the third embodiment.

FIG. 7 is a block diagram that shows the functional configuration of an image capture and display apparatus 700 according to the third embodiment. In the structural layout of the third embodiment, the counter control unit 111 of the first and second embodiments is not necessary. In the third embodiment, an image capturing unit 701 has a function that allows it to change the nature of the image capture processing with a command from a driving control unit 710. The image capturing unit 701 is designed so as to allow switching between executing/omitting image processing such as edge enhancement or noise reduction in the image capture processing, or changes to the resolution of the image, for example. Further, a parameter storage unit 712 stores the relationship between the image capture processing and the processing time. For example, the parameter storage unit 712 stores the time that can be shortened by simplifying the image capture processing (omitting edge enhancement, omitting noise reduction, reducing the resolution).

A waiting time measuring unit 706 measures the display waiting time T and the vertical synchronizing signal interval R like in the second embodiment. Then, a timing correction calculation unit 707 calculates the image capture processing time that can be shortened, from the results of the measurement by the waiting time measuring unit 706. The timing correction calculation unit 707 then determines the processing that can be simplified based on the results of that calculation and the relationship between the reduced time and simplification of the image capture processing that is stored in the parameter storage unit 712, and sends a command to the driving control unit 710. The driving control unit 710 switches the content of the image capture processing by the image capturing unit 701 in accordance with the command from the timing correction calculation unit 707. This is described in greater detail below using FIGS. 8A and 8B.

FIGS. 8A and 8B are diagrams that show how the image capture processing is simplified in order to shorten the display delay time. In this example, four processes are executed as image capture modalities.

FIG. 8A expresses the image capturing, image reading, and display operations by a conventional image capture and display apparatus (which is an apparatus that cannot change the content of the image capture processing), and FIG. 8B expresses the image capturing, image reading, and display operations by the image capture and display apparatus 700 of this embodiment. The display delay time indicates the delay D from image capture to display, and in the real time image capture/display operation shown in FIG. 8A, a delay D1 always occurs. In the third embodiment, this display delay time can be shortened (delay D2<delay D1) as shown in FIG. 8B by changing the time that is required for the image capture process.

The waiting time measuring unit 706 measures the display waiting time T and the vertical synchronizing signal interval R. The timing correction calculation unit 707 obtains the time that can be shortened by simplifying the image capturing processing from the parameter storage unit 712, and selects processing to be omitted in order to shorten the image capture processing time by U+a (where U=R−T). For example, when the timing correction calculation unit 707 determines that edge enhancement processing is to be omitted, it sends notification of this to the driving control unit 710. The driving control unit 710 omits the edge enhancement processing by the image capturing unit 701. By shortening the image capture processing time in this way, the display waiting time (vertical synchronizing signal waiting time) becomes the time a. However, because the unit by which time is shortened in the third embodiment is the time that is shortened by simplifying the processing, it will not always be the case that the waiting time is the time a. Since the image capture processing is simplified, there is a relatively significant shortening of the display delay time. It should be noted that with regard to the image capture processing that is to be omitted, it is also possible to obtain the permission of the user to simplify the image capture processing via the image display screen.

With the third embodiment, the timer counter unit 108, the counter monitoring unit 109, and the driving control unit 710 constitute an imaging control unit that operates the image capturing unit 701 to execute the imaging operation at a first time interval (image capturing interval). The image memory unit 102, the image read/output unit 103, and the image read/output control unit 105 constitute a display control unit that allows the image data obtained through the imaging operation to be displayed on the image display unit 104 at a second time interval (vertical synchronizing interval) that is different from the first time interval. The waiting time measuring unit 706 measures the display waiting time from the beginning of a standby state in which it is possible for the image display unit 104 to display the image data that have been obtained by the imaging operation, to the time that the display control unit displays that image data on the image display unit 104. The timing correction calculation unit 707 and the driving control unit 710 change the processing between the imaging operation and the standby state in order to shorten the display delay time to the display of the image data that are obtained by the imaging operation of the image capturing unit 701 on the image display unit 104, based on the display waiting time. More specifically, the processing that falls between the imaging operation by the image capturing unit 701 and storage of the image data on the image memory unit 102 is simplified (edge enhancement or noise reduction processing is omitted, the resolution is lowered, etc., in the image capturing unit 701). By performing control in this way, it is possible to achieve a shorter display delay time, as illustrated by FIG. 8B.

Fourth Embodiment

Next, the configuration and operation of an image capture and display apparatus according to a fourth embodiment will be described. In the third embodiment, the display delay time was shortened by simplifying the processing included in the image capture processing. In the fourth embodiment, the display delay time is shortened by adjusting the processing time that is required for the image processing that is executed on the image data stored in the memory.

Figure 9:
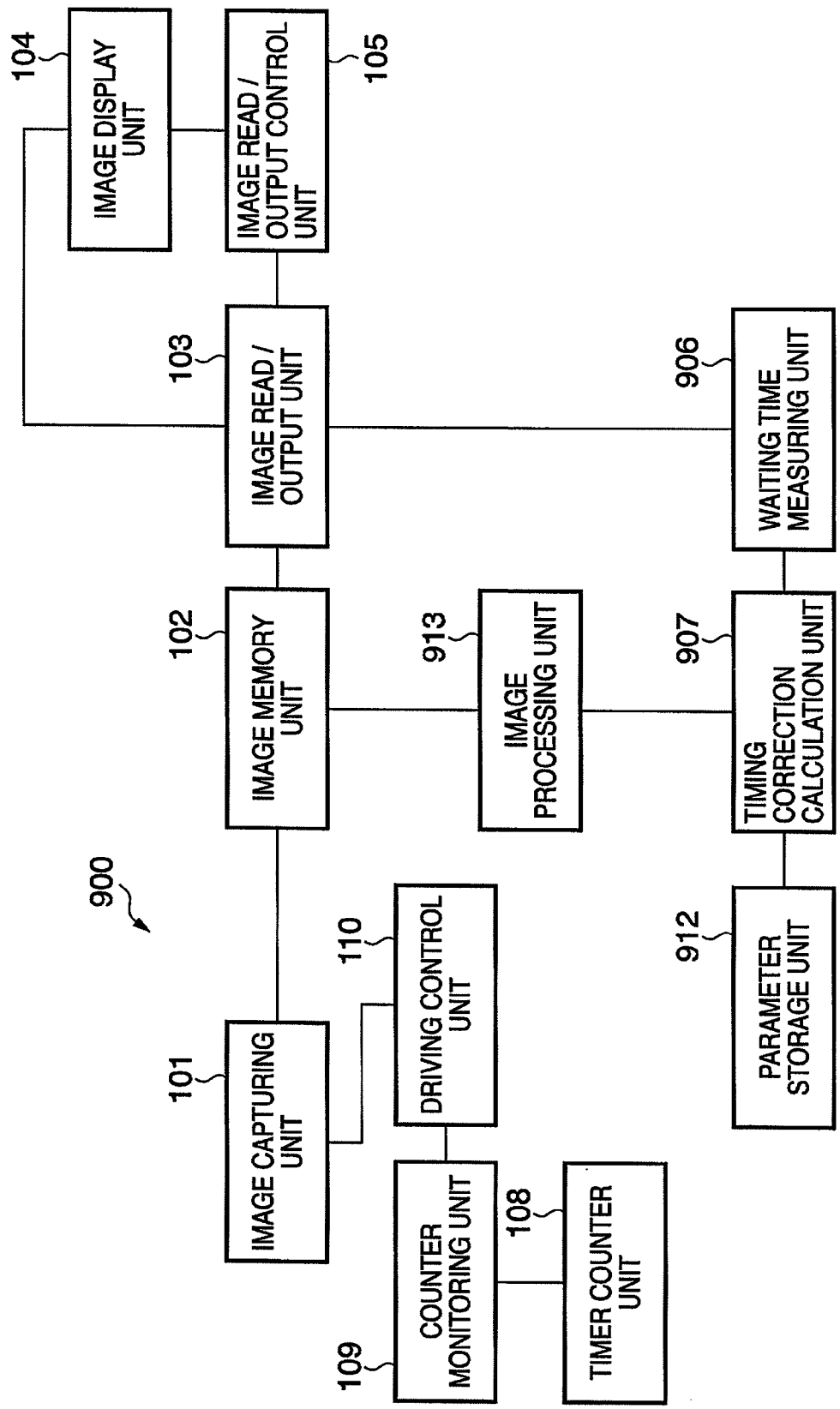
FIG. 9 is a block diagram showing the functional configuration of the image capture and display apparatus according to the fourth embodiment.

FIG. 9 is a block diagram that shows the functional configuration of an image capture and display apparatus 900 according to the fourth embodiment. In the structural layout of the fourth embodiment, the counter control unit 111 of the first and second embodiments is not necessary. In FIG. 9, an image processing unit 913 executes image processing on the image information stored on the image memory unit 102. A parameter storage unit 912 stores the processing time of each image processing modality executed by the image processing unit 913.

FIGS. 10A and 10B illustrate how the timing is corrected in the fourth embodiment. FIG. 10A represents the operation by an image capture and display apparatus in which it is not possible to change the image processing content, and FIG. 10B represents the operation by the image capture and display apparatus 900 of this embodiment. The display delay time indicates the delay D from image capture to display, and in the real time image capture/display operation shown in FIG. 1A, a delay D1 always occurs. In the fourth embodiment, this display delay time is shortened (delay D2<delay D1) by changing the time that is required for the image processing, as shown in FIG. 10B.

Unlike in the first through third embodiments, image processing by the image processing unit 913 is performed in the period up to display of the image. Several processes are executed under image processing. In the example of FIG. 10B, there are four types of image processing being executed. Here, image processing includes processes that can be omitted, such as enlarging/shrinking and rotation.

A waiting time measuring unit 906 measures the display waiting time T and the vertical synchronizing signal interval R. A timing correction calculation unit 907 obtains the time that can be shortened by simplifying the image capturing processes from a parameter storage unit 912, and selects processing to be omitted in order to shorten the image capture processing time by U+a (where U=R−T). Thus, the processing time of the image processing unit 913 is shortened, resulting in a display waiting time (vertical synchronizing waiting time) of only time a. However, because the unit by which the time is shortened in this case is the time that is required by the image processing to be omitted, it will not always be the case that the waiting time will be the time a. The display delay D is shortened relatively significantly due to omitting image processing. It should be noted that, like the case of simplifying the image capture processing, with regard to the image processing that is to be omitted it is also possible to obtain the permission of the user to omit image processing via the image display screen.

It should be noted that it should be obvious to those skilled in the art that it is also possible to simultaneously adopt both the simplification of image capture processing of the third embodiment and the simplification of image processing of the fourth embodiment.

Thus, in the fourth embodiment, there is an image processing unit 913 that executes image processing (enlargement, shrinking, rotation, etc.) on the image data that are obtained by the imaging operation and stored on the image memory unit 102. The timing correction calculation unit 907 then simplifies the processing by the image processing unit 913 (forbids execution of the enlargement process, for example) based on the display waiting time that has been obtained by the waiting time measuring unit 906. By performing control in this way, it is possible to achieve a reduction in the display delay time as illustrated in FIG. 10B.

Fifth Embodiment

Figure 11:
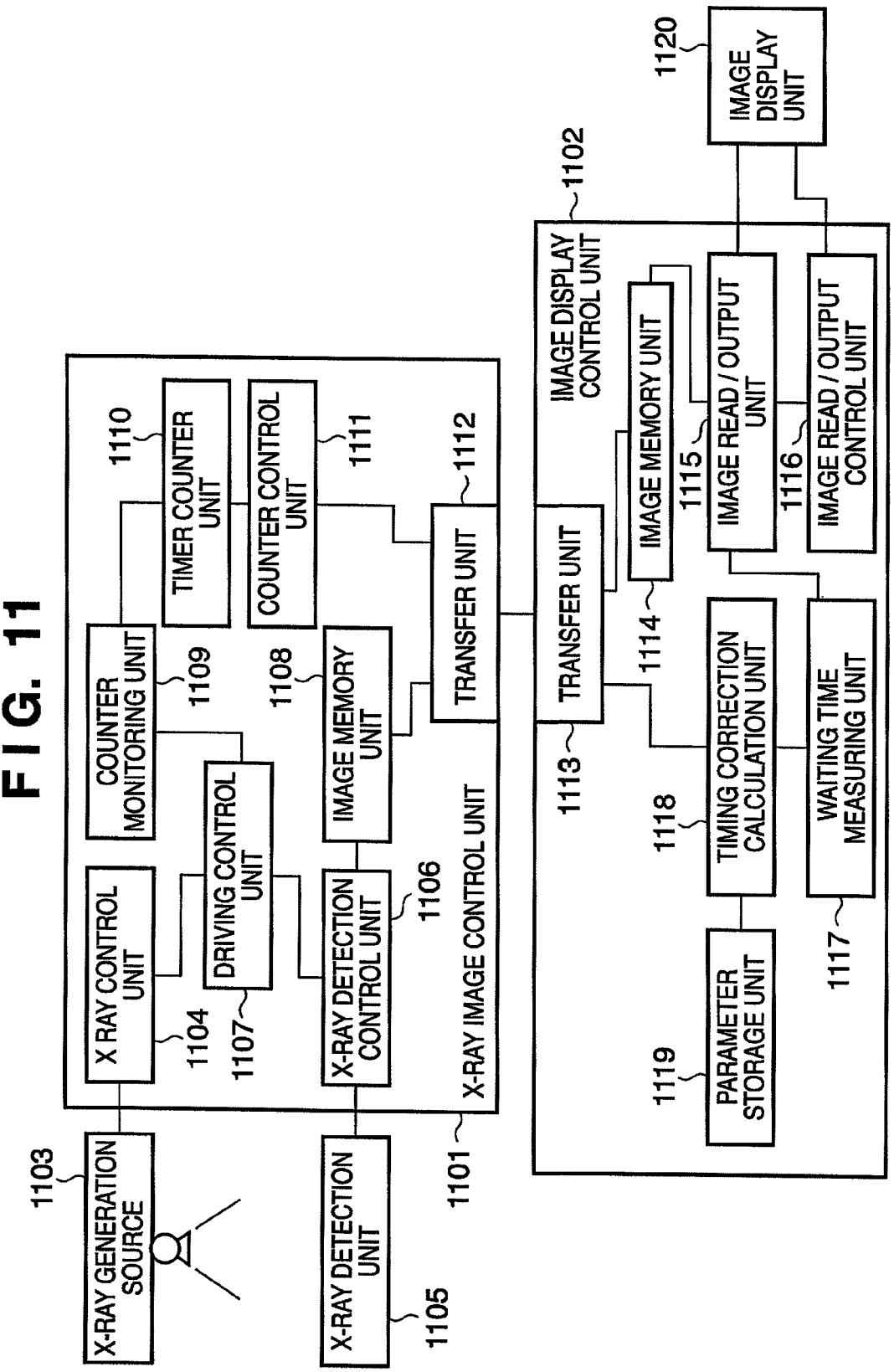
FIG. 11 is a block diagram showing the functional configuration of an x-ray fluoroscopy apparatus according to the fifth embodiment.

Next, a fifth embodiment will be described. FIG. 11 is a block diagrams that shows the functional configuration of an x-ray fluoroscopy system according to the fifth embodiment. It should be noted that the device for detecting x-rays (x-ray image control unit) can be housed in the same unit as the device for displaying images (image display control unit), but in the fifth embodiment a configuration in which both devices are connected via a dedicated line is described. In other words, the x-ray image control unit transmits image data that have been obtained by imaging to the image display control unit via transmission, and the image display control unit displays the image data that have been sent.

In FIG. 11, an x-ray image control unit 1101 controls the production and obtaining of x-rays, as well as the transfer of x-ray images. An X-ray image display control unit 1102 (hereinafter, the image display control unit 1102) controls the display of x-ray image data sent from the x-ray image control unit 1101. An x-ray generation source 1103 generates x-rays. An x-ray control unit 1104 controls the amount of x-ray radiation and the x-ray generation time by the x-ray generation source 1103. An x-ray detection unit 1105 detects x-rays that have been irradiated from the x-ray generation source 1103. An x-ray detection control unit 1106 controls the x-ray detection unit 1105 and converts information that is obtained from the x-ray detection unit 1105 into image data. A driving control unit 1107 synchronizes and drives the x-ray control unit 1104 and the x-ray detection control unit 1106. An image memory unit 1108 stores image data from the x-ray detection control unit 1106.

A counter monitoring unit 1109, a timer counter unit 1110, and a counter control unit 1111 are identical to the counter monitoring unit 109, the timer counter unit 108, and the counter control unit 111 of the first and second embodiments. A transfer unit 1112 sends image data stored on the image memory unit 1108 to the image display control unit 1102 and receives timing correction data, for example, from the image display control unit 1102.

In the image display control unit 1102, a transfer unit 1113 receives image data that have been sent from the x-ray image control unit 1101 and sends timing correction information, for example, to the x-ray image control unit 1101. It should be noted that a communications medium such as the Ethernet (registered trademark) or one that performs information transmission such as a camera link is used as the medium for this communication, and a protocol such as TCP or UDP can be adopted as the transfer protocol. An image memory unit 1114 stores image data received by the transfer unit 1113. An image read/output unit 1115, an image read/output control unit 1116, and an image display unit 1120 are the same as the image read/output unit 103, the image read/output control unit 105, and the image display unit 104 of the first and second embodiments.

A waiting time measuring unit 1117, a timing correction calculation unit 1118, and a parameter storage unit 1119 have the same structure as the waiting time measuring unit 506, the timing correction calculation unit 507, and the parameter storage unit 512 of the second embodiment. In this case, the timing correction calculation unit 1118 calculates U−a as described in the second embodiment, and the counter control unit 1111 shortens the image capturing interval with respect to the next image capture by that calculated value, thereby shortening the display delay time. Alternatively, it is also possible for the waiting time measuring unit 1117 and the timing correction calculation unit 1118 to have the same configuration as the waiting time measuring unit 106 and the timing correction calculation unit 107 of the first embodiment. In this case, the parameter storage unit 1119 can be omitted. Hereinafter, the fifth embodiment will be described using the correction method that was described in the first embodiment, that is, the method of optimizing the image capturing timing and the display timing by extending the image capturing interval by the time T−a.

Figure 12:
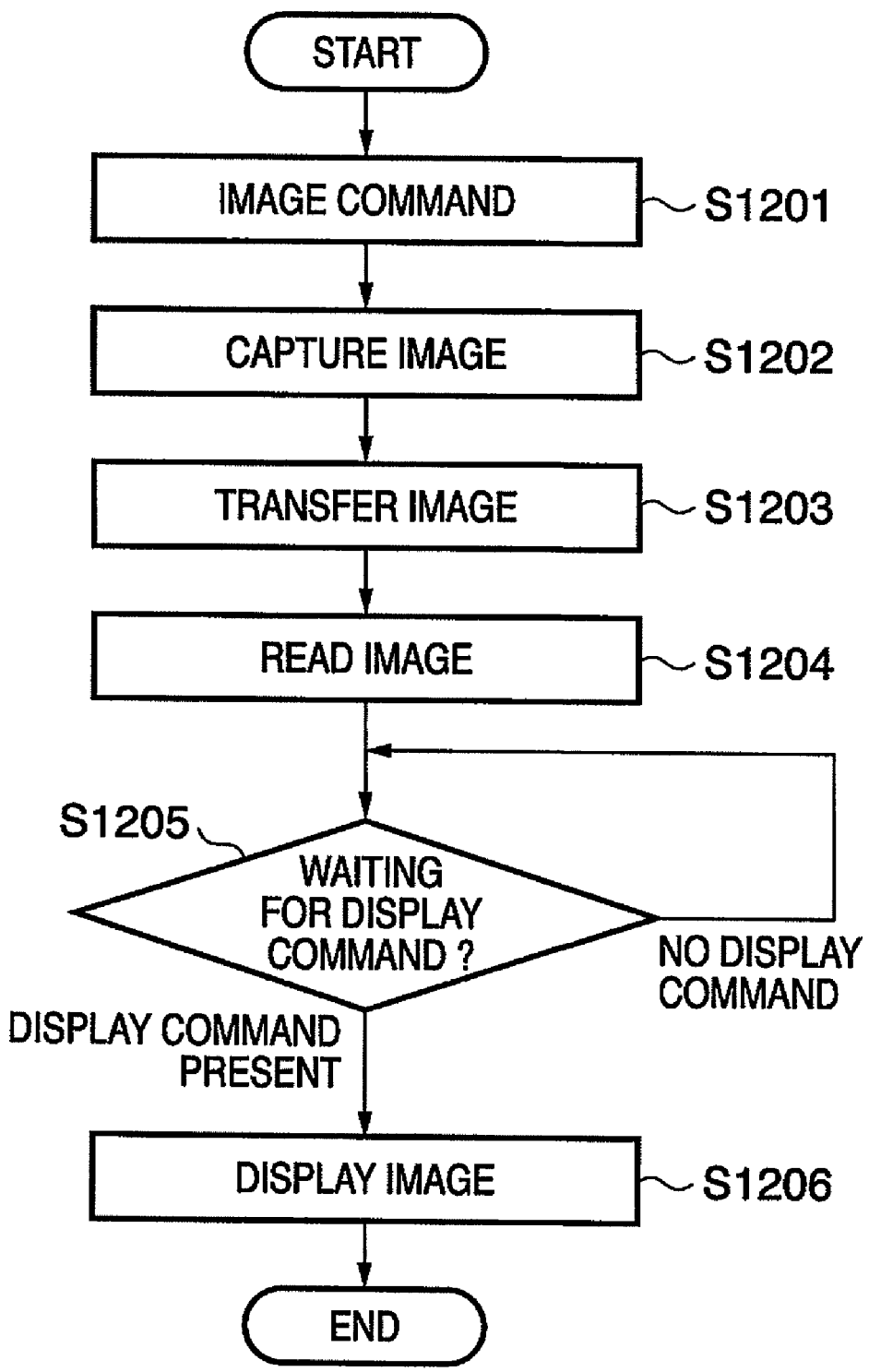
FIG. 12 is a flowchart showing the image display processing according to the fifth embodiment.

FIG. 12 is a flowchart that shows the processing from the capture to the display of an x-ray image in the x-ray fluoroscopy system of the fifth embodiment.

The fifth embodiment differs from the first through fourth embodiments in that it includes the transfer of image data between the x-ray image control unit 1101 and the image display control unit 1102. In step S1201, the driving control unit 1107 sends a command to start image capture to the x-ray control unit 1104 and the x-ray detection control unit 1106. Based on this command, in step S1202 the x-ray control unit 1104 causes the x-ray generation source 1103 to emit an x-ray, and the x-ray detection control unit 1106 detects the x-ray that has been emitted as an x-ray image from the x-ray detection unit 1105. X-ray fluoroscopy is thus executed. It should be noted that the x-ray image data that are obtained (hereinafter, referred as image data) are stored on the image memory unit 1108. Then, in step S1203, the transfer unit 1112 sends the image data held on the image memory unit 1108 to the image display control unit 1102.

The image data that have been transmitted are received by the transfer unit 1113 and stored in the image memory unit 1114. In step S1204, the image read/output unit 1115 reads the image data stored on the image memory unit 1114, and becomes capable of outputting the image data to the image display unit 1120. In step S1205, the image read/output unit 1115 is on standby until a display command (output command) arrives from the image read/output control unit 1116. When it receives a display command from the image read/output control unit 1116, then, in step S1206, the image read/output unit 1115 outputs the image data so that the data may be displayed to the image display unit 1120. Here, the image read/output control unit 1116 outputs an image display command to the image read/output unit 1115 after receiving a vertical synchronizing signal from the image display unit 1120.

FIG. 13 is a flowchart for describing image capturing timing correction in the x-ray fluoroscopy system of the fifth embodiment. Steps S1301 and S1302 are the same as those of the first embodiment (steps S301 and S302 of FIG. 3). In step S1303, the transfer unit 1113 of the image display control unit 1102 sends corrected data calculated by the timing correction calculation unit 1118 to the x-ray image control unit 1101. In the x-ray image control unit 1101, the corrected data are received by the transfer unit 1112. In step S1304, the counter control unit 1111 controls the timer counter unit 1110 based on the corrected data that are received by the transfer unit 1112, and achieves a reduction in the display delay time.

FIGS. 14A and 14B are diagrams that illustrate how the timing is corrected in the fifth embodiment. In this embodiment, an image transfer process has been added. FIG. 14A expresses the image capture, image transfer, image reading, and display operations by a conventional x-ray fluoroscopy system. FIG. 14B expresses the image capture, image transfer, image reading, and display operations by the x-ray fluoroscopy system of this embodiment. The display delay time indicates the delay D from the capture of an image by the x-ray image control unit 1101 to display by the image display control unit 1102. In the real time image capture/display operation shown in FIG. 14A, a delay D1 always occurs. In this embodiment, control is performed such that the display delay time is shortened (delay D2<delay D1) as shown in FIG. 14B.

FIGS. 14A and 14B show a case in which an image transfer process has been added to the timing correction of the first embodiment. Even though an image transfer process has been added, it is possible to obtain the same effect as in the first embodiment by performing the same timing correction processing. In the fifth embodiment it is also possible to adopt the same correction processing as in the second and third embodiments, as should be obvious to those skilled in the art.

Sixth Embodiment

Next, a sixth embodiment is described. In the fifth embodiment, correction data for fixing the display delay time was calculated by the image display control unit 1102, but in the sixth embodiment the correction data are calculated by the x-ray image control unit.

Figure 15:
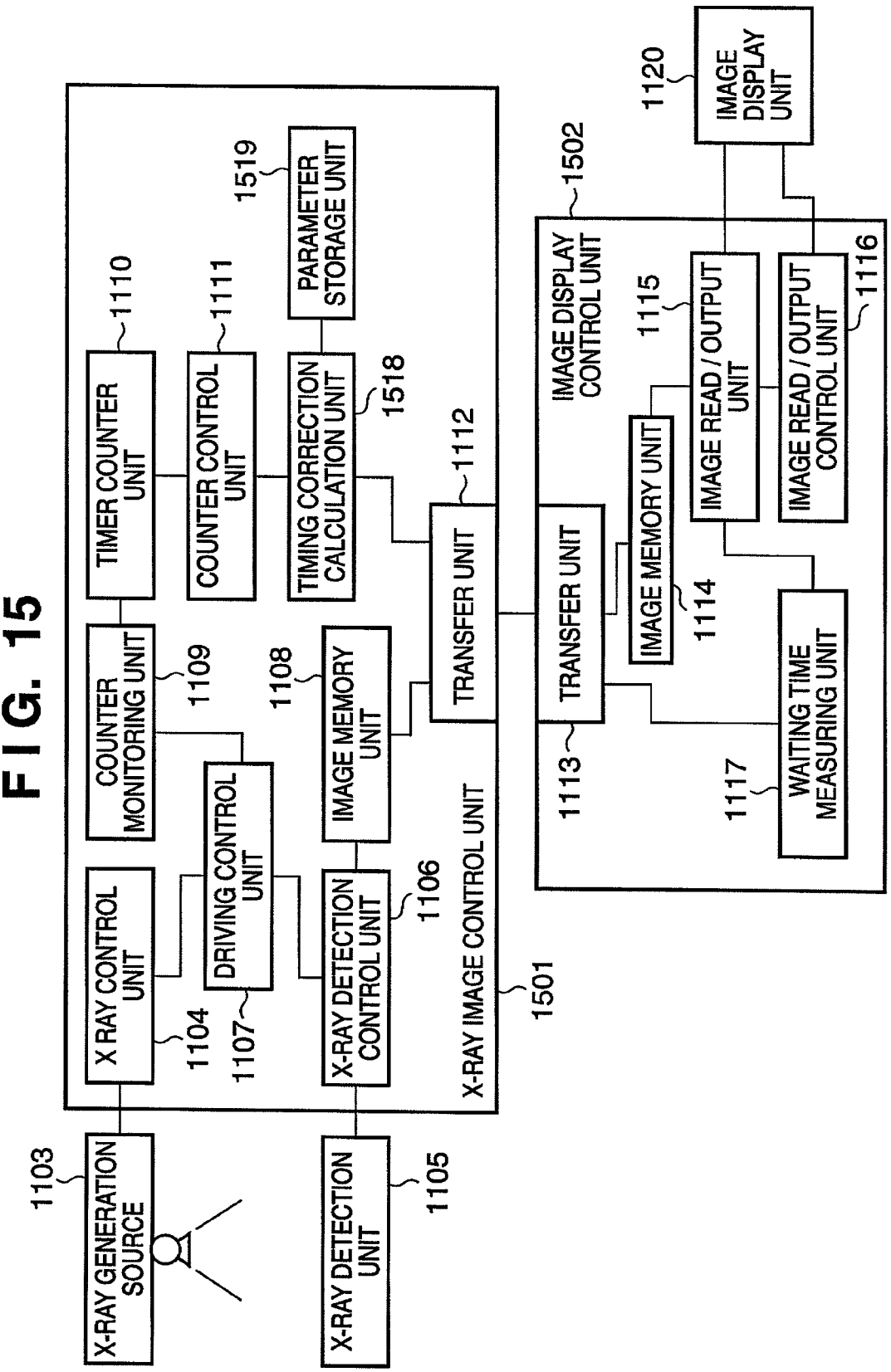
FIG. 15 is a block diagram showing the functional configuration of an x-ray fluoroscopy system according to the sixth embodiment.

FIG. 15 is a block diagram that shows the functional configuration of an x-ray fluoroscopy system according to the sixth embodiment. Structural components that are identical to those of the fifth embodiment (FIG. 11) have been assigned the same reference numerals as before. The timing correction calculation unit 1118 and the parameter storage unit 1119 that were provided in the image display control unit in the fifth embodiment are provided in an x-ray image control unit 1501 as a timing correction calculation unit 1518 and a parameter storage unit 1519. The transfer unit 1113 of an image display control unit 1502 sends data on the display waiting time that have been measured by the waiting time measuring unit 1117 to the transfer unit 1112 of the x-ray image control unit 1501.

For example, if the operation is carried out based on the correction method of the second embodiment, then the shortest interval between imaging by the x-ray detection control unit 1106 is stored on the parameter storage unit 1519. Then, the timing correction calculation unit 1518 obtains the interval R of the vertical synchronizing signal that has been sent from the image display control unit 1502 and the display waiting time T, and calculates the time U by which display was missed (U=R−T). The counter control unit 1111 is controlled so as to shorten the image capturing interval until the next image capture by the x-ray detection unit 1105 by the amount U+a.

It should be noted that it goes without saying that in the sixth embodiment, like in the fifth embodiment, it is also possible to adopt the correction method of the first embodiment or the third embodiment.

Figure 16:
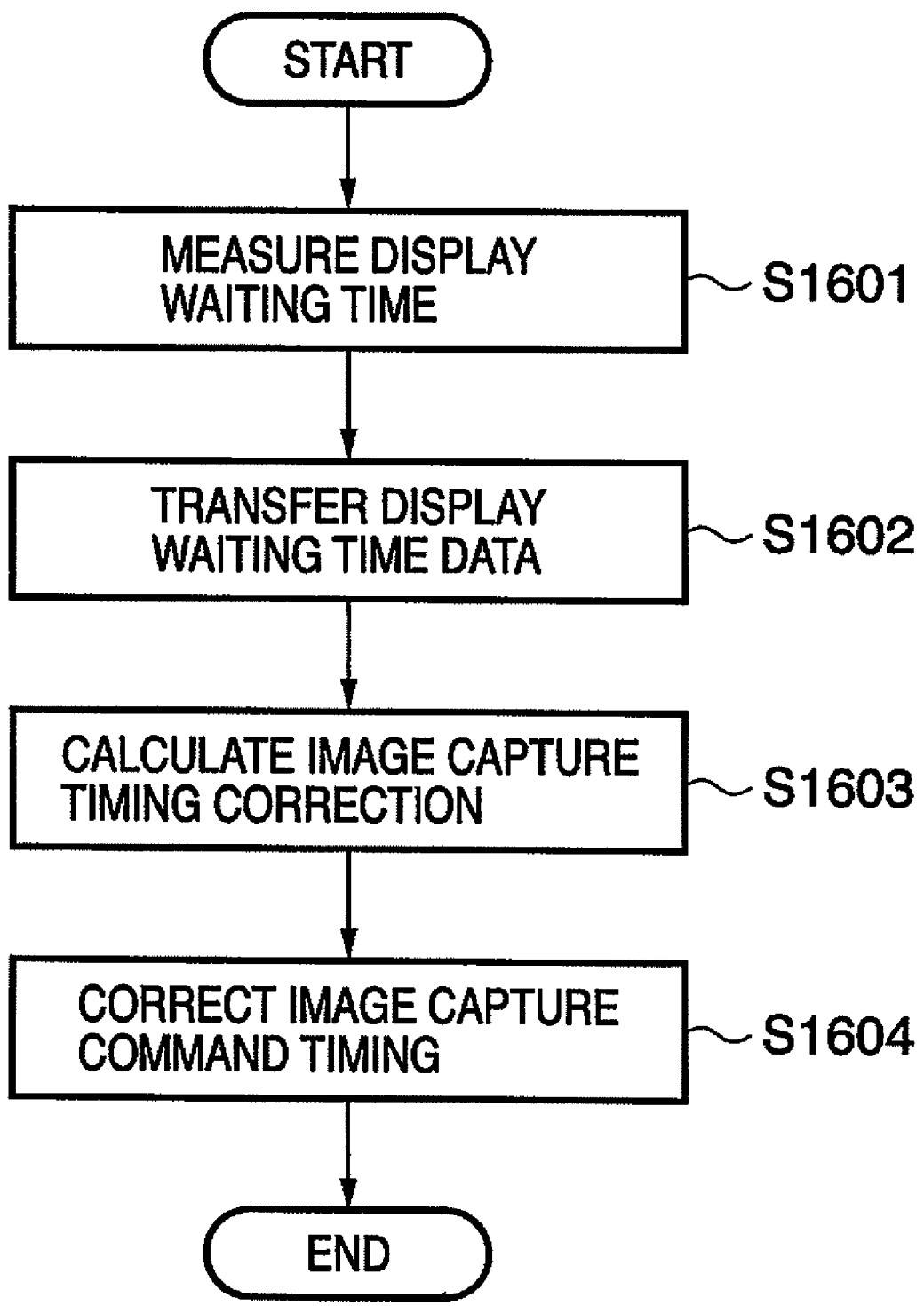
FIG. 16 is a flowchart showing the timing correction processing according to the sixth embodiment.

The processing from the capture of an x-ray image until its display according to the sixth embodiment is the same as in the fifth embodiment (FIG. 12). The image capturing timing correction in the x-ray fluoroscopy system of the sixth embodiment is described below in reference to the flowchart of FIG. 16.

The processing of steps S1601 and S1604 are the same as in steps S301 and S303 of the first embodiment (FIG. 3). In step S1602, the image display control unit 1502 sends the wait time data (including the interval of the vertical synchronizing signal) measured by the waiting time measuring unit 1117 to the x-ray image control unit 1501 via the transfer unit 1113. In the x-ray image control unit 1501, the transfer unit 1112 receives the time information. In step S1603, the image capturing timing correction calculation unit 1518 calculates correction data for correcting the image capturing timing based on the waiting time data received by the transfer unit 1112 and the shortest image capturing interval, which is stored in the parameter storage unit 1519.

It should be noted that a time chart that shows the operation from the capture to the display of an image in the sixth embodiment is same as the time chart of FIG. 6B to which "image transfer" such as that shown in FIG. 14B has been added, and since this should be clear to persons skilled in the art, it has not been shown.

Seventh Embodiment

Next, a seventh embodiment is described. In the seventh embodiment, like in the sixth embodiment, the correction data for improving the display delay time is calculated on the x-ray image control unit. However, in the seventh embodiment, the configuration for measuring the display waiting time also has been provided on the x-ray image control unit side.

Figure 17:
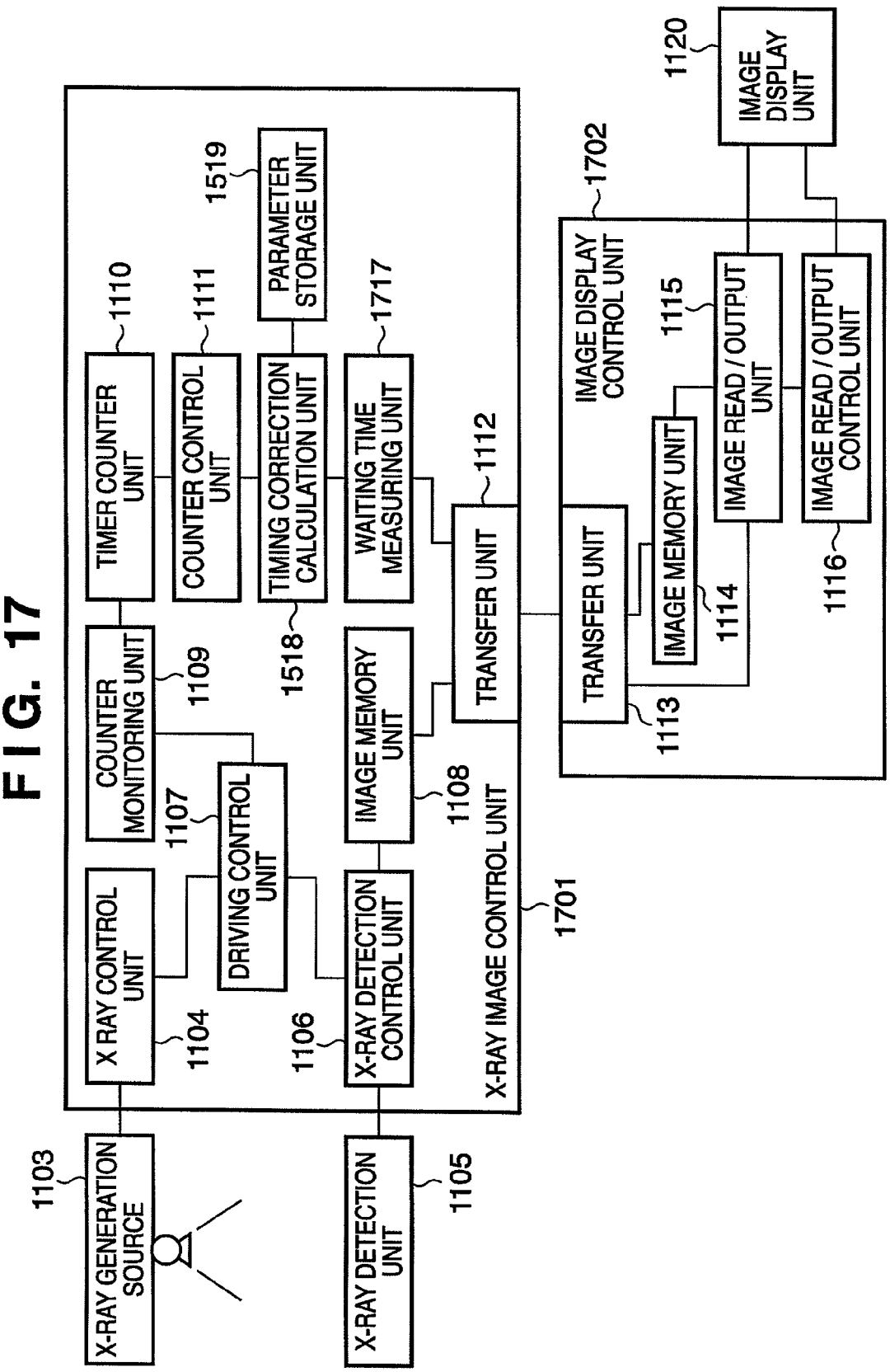
FIG. 17 is a block diagram showing the functional configuration of an x-ray fluoroscopy apparatus according to the seventh embodiment.

FIG. 17 is a block diagram that shows the functional configuration of an x-ray fluoroscopy system according to the seventh embodiment. Structural components that are identical to those of the sixth embodiment (FIG. 15) have been assigned the same reference numerals as before. The waiting time measuring unit 1117 that was provided on the image display control unit side in the sixth embodiment has been provided as a waiting time measuring unit 1717 in an x-ray image control unit 1701.

The image read/output unit 1115 of an image display control unit 1702 reads image information stored on the image memory unit 1114, and when finished reading the image, outputs a signal indicating the completion of image output preparation. The transfer unit 1113 sends this image output preparation completion signal to the x-ray image control unit 1701. The image read/output control unit 1116 receives the vertical synchronizing signal from the image display unit 1120 showing its display interval, and controls the output timing of the image read/output unit 1115 according to that vertical synchronizing signal. The image read/output unit 1115 starts image output according an output command signal from the image read/output control unit 1116. The image read/output unit 1115 receives the vertical synchronizing signal of the image display unit 1120 via the image read/output control unit 1116 or from the image display unit 1120 directly, and sends it from the transfer unit 1113 to the x-ray image control unit 1701.

In the x-ray image control unit 1701, the transfer unit 1112 receives the image output preparation completion signal and the vertical synchronizing signal. The waiting time measuring unit 1717 for example realizes control of the image capturing interval according to the correction method of the second embodiment by measuring the vertical synchronizing signal interval R and the display waiting time T based on the vertical synchronizing signal and the image output preparation completion signal that are received from the image display control unit 1702. It should be noted that here it is also possible for the image read/output unit 1115 to generate the image output preparation completion signal and an image output start signal that is synchronized with the vertical synchronizing signal, rather than the image read/output control unit 1116 relaying the vertical synchronizing signal.

It should be noted that if the correction method of the first embodiment is adopted, then it is not necessary for the waiting time measuring unit 1717 to measure the interval of the vertical synchronizing signal, and thus it is not necessary for the vertical synchronizing signal to be communicated between the transfer units 1112 and 1113. In this case, the image read/output unit 1115 outputs a signal that indicates the start of display output at the timing to start display output of the image, and this can be sent from the transfer unit 1113 to the x-ray image control unit 1701. The waiting time measuring unit 1717 measures the display waiting time T based on the image output preparation completion signal and the signal indicating the start of display output, and uses this to control the image capturing interval like in FIG. 14B.

The processing from the capture to the display of the x-ray image in the x-ray fluoroscopy system of the seventh embodiment is the same as in the fifth embodiment (FIG. 12).

Figure 18:
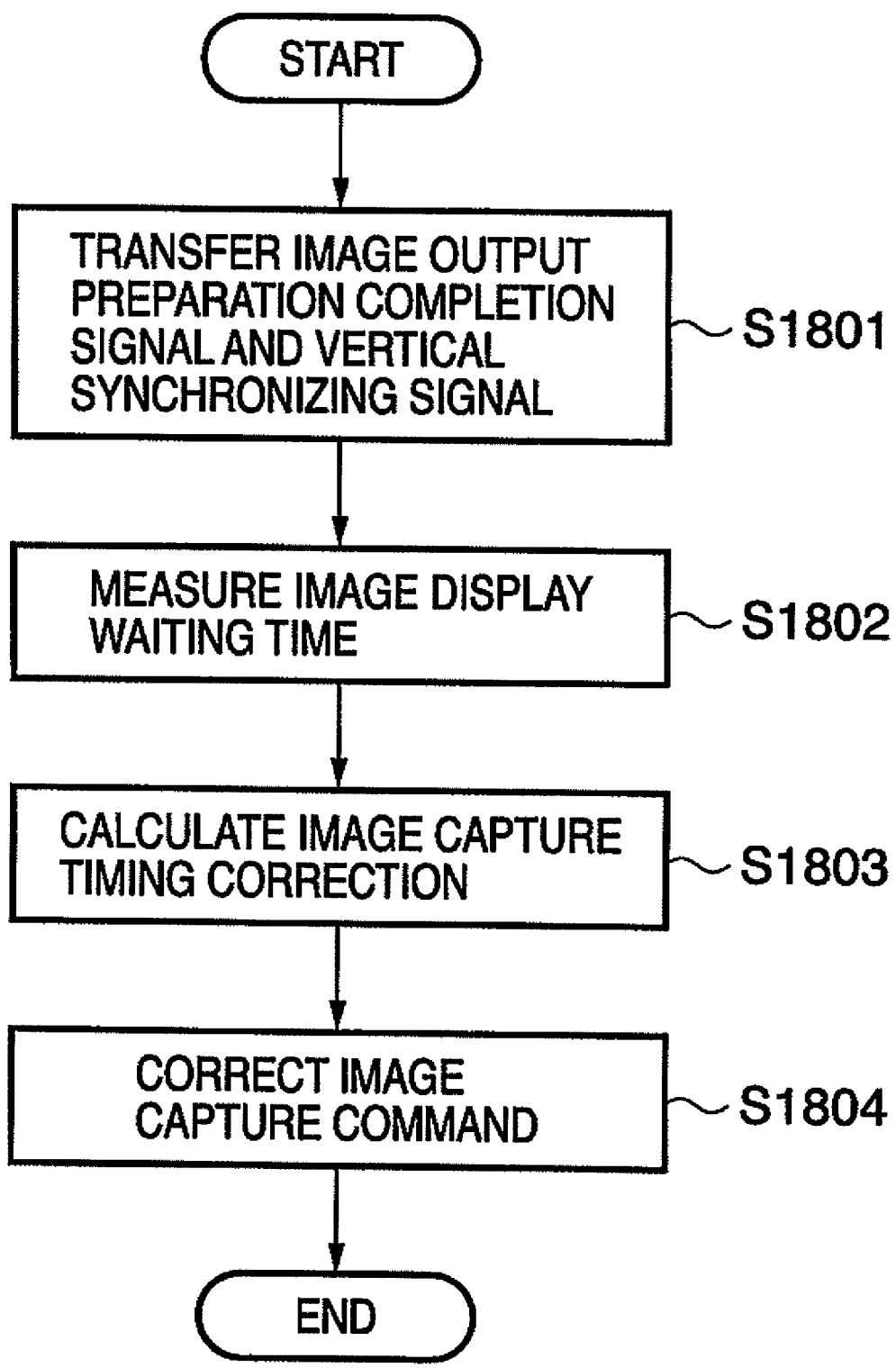
FIG. 18 is a flowchart showing the timing correction processing according to the seventh embodiment.

FIG. 18 is a flowchart for describing image capturing timing correction in the x-ray fluoroscopy system of the seventh embodiment. In step S1801, the image read/output unit 1115 reads the information of a single image from the image memory unit 1114, and outputs the signal indicating the completion of image output preparation at the point that it is possible to output the image. This image output preparation completion signal is sent from the transfer unit 1113 to the x-ray image control unit 1701. The vertical synchronizing signal from the image display unit 1120 also is sent from the transfer unit 1113 by the image read/output control unit 1116 and the image read/output unit 1115.

In step S1802, the waiting time measuring unit 1717 receives the image output preparation completion signal and the vertical synchronizing signal that have been received by the transfer unit 1112, and measures the display waiting time T and the interval R of the vertical synchronizing signal. Then, in step S1803, the timing correction calculation unit 1518 obtains the interval R of the vertical synchronizing signal and the display waiting time T from the waiting time measuring unit 1717 and calculates the time U by which display was missed as the correction data (U=R−T). Next, in step S1804, the timing correction calculation unit 1518 controls the counter control unit 1111 so that the image capturing interval to the next image capture by the x-ray detection unit 1105 is shortened by the amount of U+a.

It should be noted that a time chart that shows the operation from the capture to the display of an image in the seventh embodiment is the time chart of FIG. 6B to which "image transfer" like that shown in FIG. 14B has been added, and since this should be clear to persons skilled in the art, it has not been shown.

It should be noted that it goes without saying that in the seventh embodiment, like in the fifth embodiment, it is also possible to adopt the correction methods of the first embodiment or the third embodiment.

Eighth Embodiment

Next an eighth embodiment is described. The eighth embodiment describes an example of an x-ray fluoroscopy system that achieves a reduction in the display delay time by changing the image processing by the image processing unit, which was described in the fourth embodiment.

Figure 19:
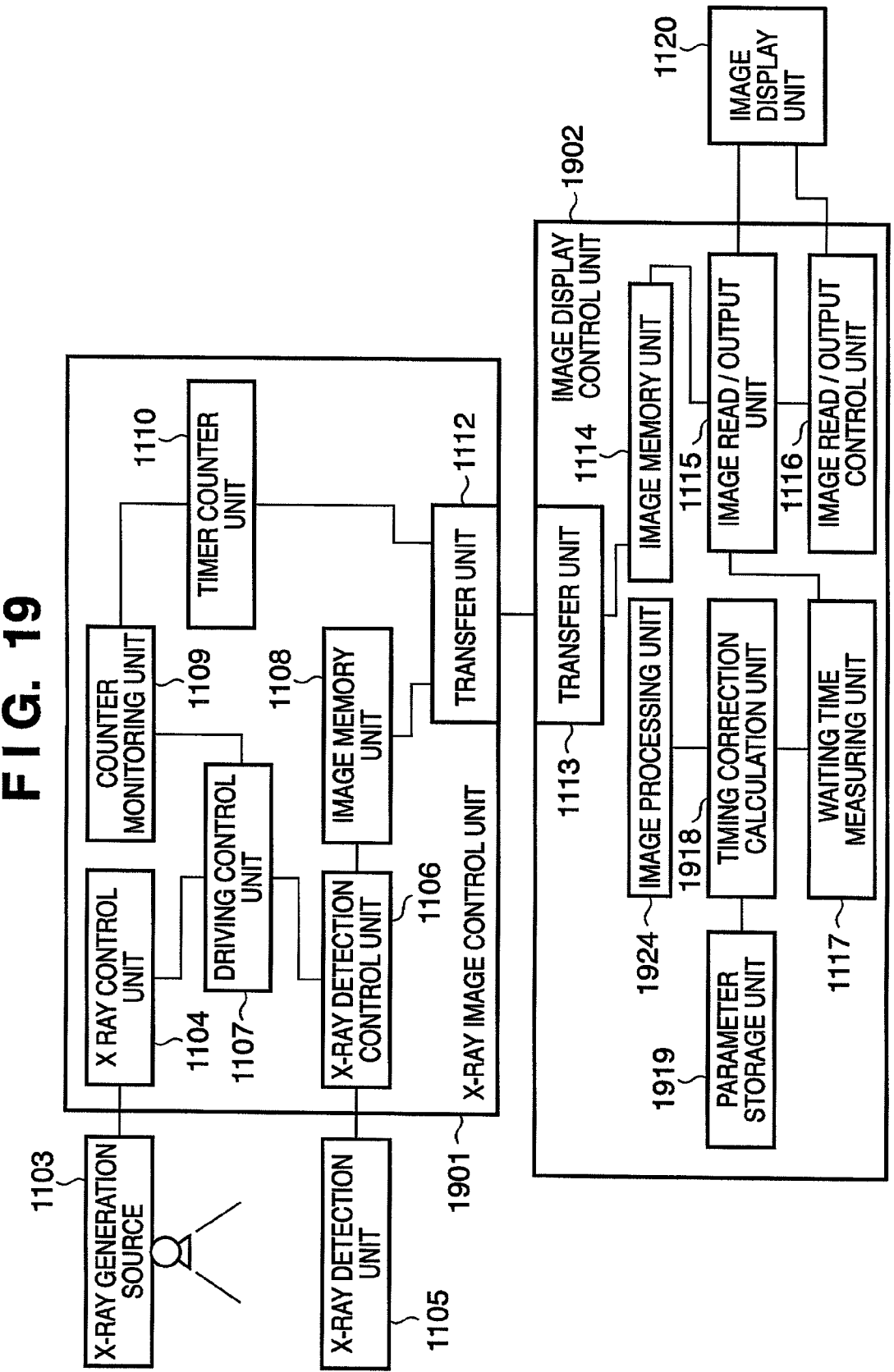
FIG. 19 is a block diagram showing the functional configuration of an x-ray fluoroscopy apparatus according to the eighth embodiment.
Figure 20:
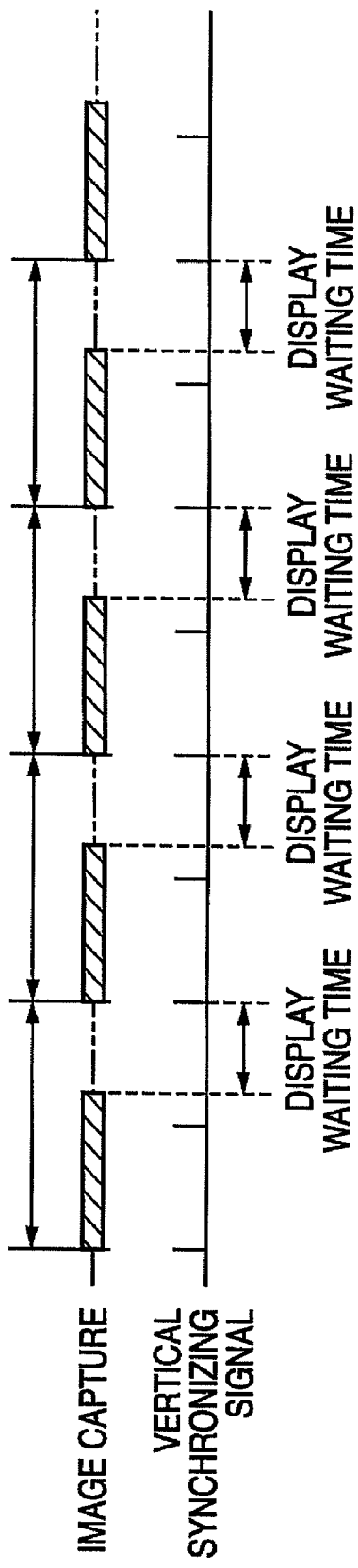
FIG. 20 is a diagram that shows an example of the issue to be solved by the invention.

FIG. 19 is a block diagram that shows the functional configuration of an x-ray fluoroscopy system according to the eighth embodiment. In FIG. 19, structural components that are identical to those of the fifth embodiment (FIG. 11) have been assigned the same reference numerals as before. An image display control unit 1902 has been provided with an image processing unit 1924 for performing image processing on the image data stored in the image memory unit 1114. Further, the counter control unit 1111 has been removed from an x-ray image control unit 1901. This is because the correction method of this embodiment achieves a reduction in the display delay time by changing the content of the image processing, and it is not necessary to change the image capture start timing.

A parameter storage unit 1919 stores the processing time of each image processing that is executed by the image processing unit 1924. A timing correction calculation unit 1918 performs a timing correction calculation and notifies the image processing unit 1924 which image processing to omit. In the eighth embodiment, like in the fourth embodiment, the display delay time is shortened by omitting image processing that is executed by the image processing unit 1924.

It should be noted that a time chart that shows the operation from the capture to the display of an image in the eighth embodiment is the time chart of FIG. 10B to which "image transfer" like that shown in FIG. 14B has been added, and since this should be clear to persons skilled in the art, it has not been shown here.

It should be noted that it goes without saying that the eighth embodiment also may include shortening of the display delay time by simplifying the image capture processing, like that described in the third embodiment.

As explained above, the various above embodiments have the effect of shortening the display delay time in real time image capture and display. Thus, they can be widely adopted across industries in which a short display delay time is desired. For example, in some x-ray fluoroscopy apparatuses for medical use, surgery is performed while conducting imaging, and thus the surgical operations of the physician must be immediately reflected on the image. In other words, the display delay time must be extremely short. The importance of real time is crucial in this instance, but a short display delay time is desirable in general apparatuses that perform real time image capture and display as well, and this gives the invention a high practical value.

Embodiments were described in detail above, and the invention can be embodied by systems, apparatuses, methods, programs, or storage media, for example. Specifically, the invention can be adopted in systems made of a plurality of machines as well for as apparatuses that are made of a single machine.

It should be noted that the functional components that were described in the first through eighth embodiments can be achieved by hardware, or can be achieved by cooperation between hardware and software by execution of predetermined software by a computer.

Consequently, the present invention includes the case of directly or remotely supplying a software program to a system or an apparatus, and then having a computer of that system or apparatus read out and execute the program code that has been supplied to achieve the functions of the embodiments discussed above. In this case, the program that is supplied is a program that corresponds to the flowcharts that were shown in the diagrams in the embodiments.

Consequently, in order to achieve the functions and processing of the invention on a computer, the program code that is installed on the computer itself also achieves the invention. That is to say, the invention is inclusive of computer program code for achieving the functions and processing of the invention.

In this case, as long as the program has the program function, the form in which it takes does not matter, and it may be object code, a program that is executed by an interpreter, or script data supplied to an OS.

Examples of recording media for supplying the program are listed below. Examples include Floppy (registered trademark) disks, hard disks, optical disks, optomagnetic disks, MOs, CD-ROMs, CD-Rs, CD-RWs, magnetic tape, nonvolatile memory cards, ROMs, and DVDs (DVD-ROMs and DVD-Rs).

In addition, it is also possible to supply the program by using a client computer browser to connect to an Internet website and then downloading the computer program of the invention from that website onto a recording medium such as a hard disk. In this case, the program that is downloaded can be a compressed file that includes a self-installation function. It is also possible to divide up the program code that constitutes the program of the invention into a plurality of files and then download each of those files from a different website. In other words, a WWW server that allows a program file for realizing the functions of the invention on a computer to be downloaded to a plural number of users also falls within the scope of the invention.

It is also possible to encrypt the program of the invention and store it on a storage medium such as a CD-ROM to distribute to users. In this case, users that have passed predetermined conditions can be allowed to download key information that decodes the encryption from a website via the Internet, and then the user may use that key information to run the encrypted program and install it on a computer.

Further, in addition to achieving the functions of the embodiments described above by the computer running the program that has been read, it is also possible achieve the functions of the embodiments in cooperation with the OS, for example, that is running on the computer, in accordance with commands from the program. In this case, the OS, etc., performs some or all of the actual processing, and the functions of the foregoing embodiments are realized through that processing.

Further, it is also possible for some or all of the functions of the foregoing embodiments to be achieved by writing a program that has been read from a recording medium to a memory that is provided in a function expansion board that has been inserted into the computer or a function expansion unit that is connected to the computer. In this case, after the program has been written to the function expansion board or the function expansion unit, the CPU, etc., provided in that function expansion board or function expansion unit carries out some or all of the actual processing, based on commands from that program.

According to the present invention, the display delay time from the capture of an image by the image capturing apparatus to display by a display apparatus is shortened, realizing image display that favorably tracks with the imaged information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-350496, filed Dec. 26, 2006, which is hereby incorporated by reference herein in its entirety.

What is claimed is:

1. An image capture and display control apparatus, comprising:
   an imaging control unit constructed to operate an image capturing unit at a first time interval so as to obtain a captured image with the image capturing unit;
   a display control unit constructed to display the captured image on a display unit, which operates at a second time interval;
   a changing unit constructed to change an image capture start timing of the image capturing unit, so as to shorten a display delay time, which is caused by the second time interval, from the image capture start timing of image capturing unit until display of the captured image by the display unit; and
   a measuring unit constructed to measure a display waiting time from the point that a standby state in which the captured image can be displayed by the display unit is entered until the display by the display unit,
   wherein said changing unit:
   determines whether or not an image capturing interval is equal to or greater than a predetermined time interval, in a case where the image capture start timing has been sped up by an adjusting time that is obtained by subtracting a predetermined time from the display waiting time;
   speeds up image capture start timing by the adjusting time, if it is determined that the image capturing interval is equal to or greater than the predetermined time interval; and
   delays the image capture start timing by the adjusting time obtained by subtracting the predetermined time from the display waiting time, if it is determined that the image capturing interval is not equal to or greater than the predetermined time.

2. The apparatus according to claim 1, wherein the changing unit is allowed to function at least one of each of a predetermined number of times and each occasion that there is detection of a predetermined operation by a user.

3. The apparatus according to claim 1, wherein the image capturing unit comprises an x-ray generation unit and an x-ray detector.

4. An image capture and display system that is provided with an imaging control apparatus for operating an image capturing unit at a first time interval so as to obtain a captured image with the image capturing unit, and a display control apparatus for causing the captured image to be displayed on a display unit, which operates at a second time interval, wherein the image capture and display system comprises:

a transmission unit constructed to send the captured image that is obtained by the image capturing unit from the imaging control apparatus to the display control apparatus;

a changing unit constructed to change an image capture start timing of the image capturing unit so as to shorten a display delay time, which is caused by the second time interval, from the image capture start timing by the image capturing unit until display of the captured image by the display unit; and a measuring unit constructed to measure a display waiting time from the point that a standby state in which the captured image can be displayed by the display unit is entered until the display by the display unit, wherein said changing unit;

determines whether or not an image capturing interval is equal to or greater than a predetermined time interval, in a case where the image capture start timing has been sped up by an adjusting time that is obtained by subtracting a predetermined time from the display waiting time;

speeds up the image capture start timing by the adjusting time, if it is determined that the image capturing interval is equal to or greater than the predetermined time interval; and delays the image capture start timing by the adjusting time obtained by subtracting the predetermined time from the display waiting time, if it is determined that the image capturing interval is not equal to or greater than the predetermined time.

5. The system according to claim 4, wherein the display control apparatus further comprises a calculating unit constructed to calculate the adjusting time for changing the image capture start timing with the changing unit, based on the display waiting time that has been measured by the measuring unit, and wherein the transmission unit also sends the adjusting time that is calculated by the calculating unit from the display control apparatus to the imaging control apparatus.

6. The system according to claim 4, wherein the imaging control apparatus further comprises a calculating unit constructed to calculate the adjusting time for changing the image capture start timing with the changing unit, based on the display waiting time that has been measured by the measuring unit, wherein the measuring unit is provided in the display control apparatus, and wherein the transmission unit also sends the display waiting time that has been measured by the measuring unit from the display control apparatus to the imaging control apparatus.

7. The system according to claim 4, wherein the measuring unit is provided in the imaging control apparatus, and wherein the transmission unit transmits to the imaging control apparatus a signal generated in the display control apparatus at the moment that the standby state is entered and a signal that is generated by the display control apparatus at the moment that image data in the standby state are displayed.

8. An image capture and display control method, comprising:

an imaging control step of operating an image capturing unit at a first time interval so as to obtain a captured image with the image capturing unit;

a display control step of causing display of the captured image by a display unit that operates at a second time interval;

a changing step of changing an image capture start timing of the image capturing unit, so as to shorten a display delay time, which is caused by the second time interval, from the image capture start timing of the image capturing unit until display of the captured image by the display unit; and a measuring step of measuring a display waiting time from the point that a standby state in which the captured image can be displayed by the display unit is entered until the display by the display unit, wherein said changing step:

determines whether or not an image capturing interval is equal to or greater than a predetermined time interval, in a case where the image capture start timing has been sped up by an adjusting time that is obtained by subtracting a predetermined time from the display waiting time;

speeds up the image capture start timing by the adjusting time, if it is determined that the image capturing interval is equal to or greater than the predetermined time interval; and delays the image capture start timing by the adjusting time obtained by subtracting the predetermined time from the display waiting time, if it is determined that the image capturing interval is not equal to or greater than the predetermined time.

9. A computer-readable storage medium storing a computer program for causing a computer to execute the image capture and display control method of claim 8.

* * * * *